(12) United States Patent
Huang et al.

(10) Patent No.: US 10,536,692 B2
(45) Date of Patent: Jan. 14, 2020

(54) PICTURE PREDICTION METHOD AND RELATED APPARATUS

(71) Applicant: HUAWEI TECHNOLOGIES CO., LTD., Shenzhen (CN)

(72) Inventors: Xin Huang, Shenzhen (CN); Hong Zhang, Shenzhen (CN); Haitao Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 203 days.

(21) Appl. No.: 15/454,356

(22) Filed: Mar. 9, 2017

(65) Prior Publication Data
US 2017/0180727 A1    Jun. 22, 2017

Related U.S. Application Data

(63) Continuation of application No. PCT/CN2015/077272, filed on Apr. 23, 2015.

(30) Foreign Application Priority Data

Oct. 31, 2014  (CN) .......................... 2014 1 0606914

(51) Int. Cl.
*H04N 19/105* (2014.01)
*H04N 19/567* (2014.01)
(Continued)

(52) U.S. Cl.
CPC ......... *H04N 19/105* (2014.11); *H04N 19/182* (2014.11); *H04N 19/44* (2014.11);
(Continued)

(58) Field of Classification Search
CPC .... H04N 19/105; H04N 19/182; H04N 19/44; H04N 19/51; H04N 19/513;
(Continued)

(56) References Cited

U.S. PATENT DOCUMENTS

| 6,289,052 | B1* | 9/2001 | Faryar | H04N 5/145 348/699 |
| 7,236,634 | B2* | 6/2007 | Miyakoshi | H04N 19/51 348/402.1 |

(Continued)

FOREIGN PATENT DOCUMENTS

| CN | 101557514 A | 10/2009 |
| CN | 101854545 A | 10/2010 |

(Continued)

OTHER PUBLICATIONS

Thomas Guionnet et al., Intra Prediction Based on Weighted Template Matching Predictors(WTM); JCTVC-G598;Geneva, CH 2011 (Year: 2011).*

(Continued)

*Primary Examiner* — Dramos Kalapodas
(74) *Attorney, Agent, or Firm* — Conley Rose, P.C.

(57) ABSTRACT

A picture prediction method and a related apparatus are disclosed, which includes: determining N templates whose degrees of matching with a current template meet a preset condition, where the current template is a template corresponding to a current picture block, and the M templates are obtained by searching reference pictures of the current picture block; determining a weight of a pixel area in a picture block corresponding to each template in the N templates, where weights of at least two pixel areas in a picture block corresponding to at least one template in the N templates are different; and calculating a predicted pixel value of a pixel area in the current picture block based on the weight and a pixel value of the pixel area in the picture block corresponding to each template in the N templates, where the pixel area includes at least one pixel.

15 Claims, 6 Drawing Sheets

(51) Int. Cl.
*H04N 19/44* (2014.01)
*H04N 19/51* (2014.01)
*H04N 19/182* (2014.01)
*H04N 19/513* (2014.01)

(52) U.S. Cl.
CPC .......... *H04N 19/51* (2014.11); *H04N 19/513* (2014.11); *H04N 19/567* (2014.11)

(58) Field of Classification Search
CPC ...... H04N 19/567; H04N 7/137; H04N 19/11; H04N 19/147; H04N 19/176; H04N 19/593; H04N 19/137; H04N 19/14; H03M 7/36
See application file for complete search history.

(56) References Cited

U.S. PATENT DOCUMENTS

| | | | | |
|---|---|---|---|---|
| 2009/0116759 | A1* | 5/2009 | Suzuki | H04N 19/61 382/238 |
| 2010/0246675 | A1* | 9/2010 | Gharavi-Alkhansari | H04N 19/105 375/240.13 |
| 2010/0272183 | A1* | 10/2010 | Kamp | H04N 19/105 375/240.16 |
| 2011/0170793 | A1* | 7/2011 | Sato | H04N 19/105 382/238 |
| 2011/0176741 | A1* | 7/2011 | Sato | H04N 19/105 382/238 |
| 2012/0320976 | A1* | 12/2012 | Suzuki | H04N 19/61 375/240.12 |
| 2014/0056348 | A1* | 2/2014 | Francois | H04N 19/105 375/240.12 |
| 2014/0105298 | A1* | 4/2014 | Kamp | H04N 19/105 375/240.14 |
| 2014/0169451 | A1* | 6/2014 | Cohen | H04N 19/176 375/240.03 |
| 2014/0169541 | A1 | 6/2014 | Baniak et al. | |
| 2015/0334417 | A1* | 11/2015 | Amon | H04N 19/105 375/240.12 |

FOREIGN PATENT DOCUMENTS

| | | |
|---|---|---|
| CN | 103700115 A | 4/2014 |
| CN | 104363449 A | 2/2015 |
| EP | 2237217 A2 | 10/2010 |
| EP | 2571272 A1 * | 3/2013 ........... H04N 19/105 |
| EP | 2571272 A1 | 3/2013 |
| EP | 2627086 A1 * | 8/2013 ............. H04N 19/11 |
| EP | 2704442 A1 * | 3/2014 ............. H04N 19/51 |
| EP | 2704442 A1 | 3/2014 |
| JP | 2007-43651 | 2/2007 |
| JP | 2011-511541 | 4/2011 |

OTHER PUBLICATIONS

Yoshinori Suzuki et al., "Inter Frame Coding With Template Matching Averaging";© 2007 IEEE: 1-4244-1437-7 (Year: 2007).*
Thomas Guionnet et al., "Intra Prediction Based on Weighted Template Matching Predictors (WTM)"; JCTVC-G598; Geneva CH, Nov. 21-30, 2011 (Year: 2011).*
Yoshinori Suzuki et al., "INTER Frame Coding With Template Matching Averaging";© 2007 IEEE: 1-4244-1437-7 (Year: 2007).*
Japanese Office Action dated Apr. 24, 2018, in corresponding Japanese Patent Application No. 2017-517280, 5 pgs.
Chinese Office Action dated Jan. 25, 2017 in corresponding Chinese Patent Application No. 201410606914.2.
International Search Report dated Aug. 10, 2015 in corresponding International Patent Application No. PCT/CN2015/077272.
Extended European Search Report dated Jul. 10, 2017 in corresponding European Patent Application No. 15855669.6.
Y-W Chen et al.: "MB Mode with Joint Application of Template and Block Motion Compensations" 2. JCT-VC Meeting; Jul. 21, 2010-Jul. 28, 2010; Geneva; (Joint Collaborative Team on Video Coding of ISO?IEC JTC1/SC29/WG11 and ITU-T SG. 16) No. JCTVC-B072, Jul. 23, 2010.
Yoshinori Suzuki et al.: "An Improved Low Delay Inter Frame Coding Using Template Matching Averaging", Picture Coding Symposium 2010; Dec. 8, 2010, XP030082006.
Guionnet T et al.: "Intra prediction based on weighted template matching predictors (WTM)" 7. JCT-VC Meeting 98; MPEG Meeting; Geneva (Joint Collaborative Team on Video Coding of ISO? IEC JTC1/SC29/WG11 and ITU-T SG. 16); Nov. 9, 2011, XP030110582.
Eugen Wige et al.: "Pixel based Averaging Predictor for HEVC Lossless Coding" Imaging and Computer Vision, Siemens Corporate Technology, Munich Germany, IEEE, 2013.
ITU:"Series H: Audiovisual and Multimedia Systems Infrastructure of audiovisual services—Coding of moving video" H.264, ITU-T, Telecommunication Standardization Sector of ITU, Feb. 2014.
International Search Report dated Aug. 10, 2015 in corresponding International Application No. PCT/CN2015/077272.

* cited by examiner

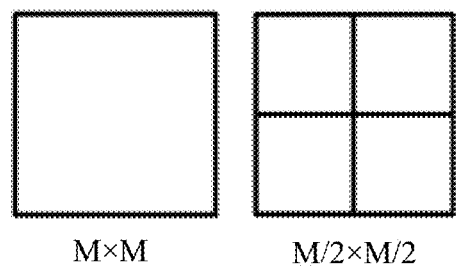
FIG. 1-a
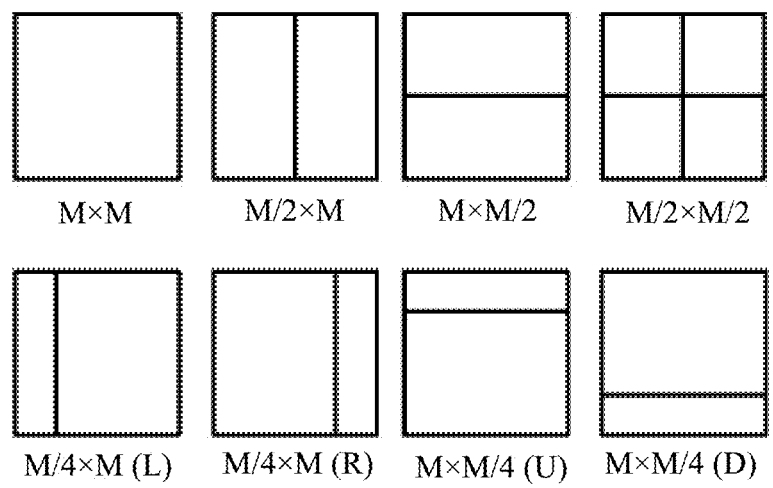
FIG. 1-b

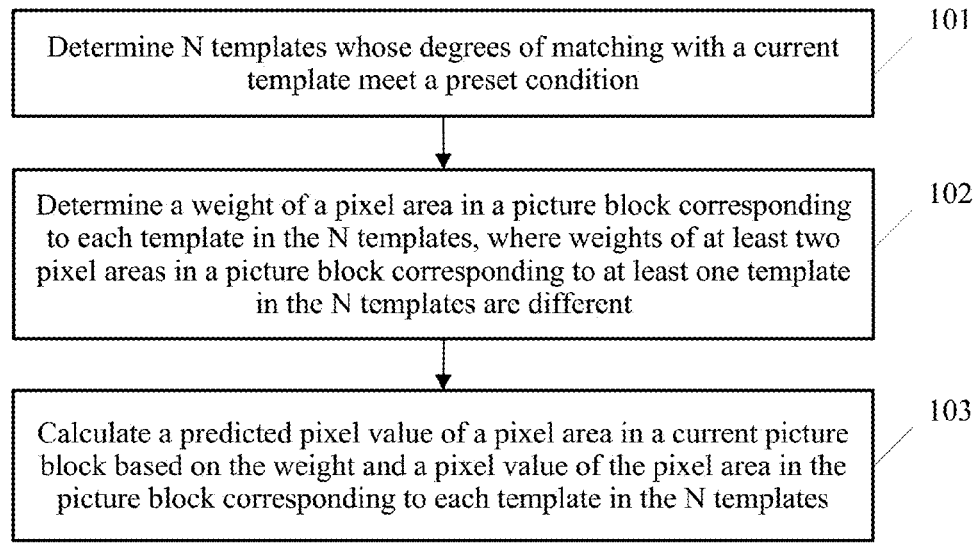
FIG. 1-c
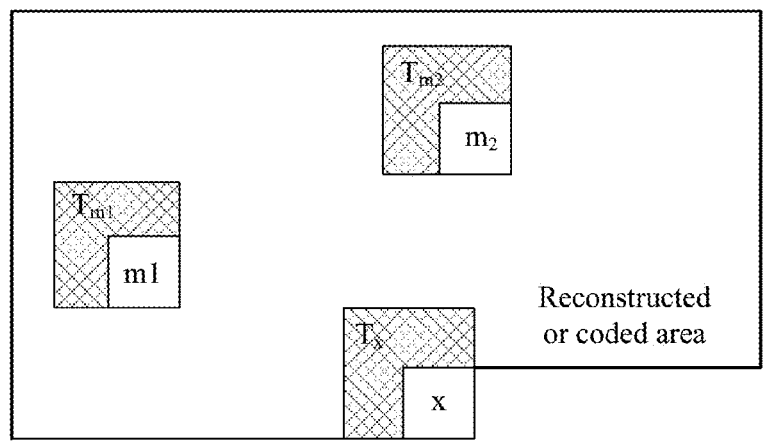
FIG. 1-d

PICTURE PREDICTION METHOD AND RELATED APPARATUS

CROSS-REFERENCE TO RELATED APPLICATIONS

This application is a continuation of International Application No. PCT/CN2015/077272, filed on Apr. 23, 2015, which claims priority to Chinese Patent Application No. 201410606914.2, filed on Oct. 31, 2014. The disclosures of the aforementioned applications are hereby incorporated by reference in their entireties.

TECHNICAL FIELD

The present application relates to the field of picture processing technologies, and specifically, to a picture prediction method and a related apparatus.

BACKGROUND

With development of photoelectric acquisition technologies and continuous increase of requirements for high-definition digital videos, an amount of video data is increasingly large. Due to limited heterogeneous transmission bandwidths and diversified video applications, higher requirements are continuously imposed on video coding efficiency. A task of developing a High Efficiency Video Coding (HEVC) standard is initiated according to the requirements.

A basic principle of video compression coding is to use correlation between a space domain, a time domain, and a code word to remove redundancy as much as possible. Currently, a prevalent practice is to use a block-based hybrid video coding framework to implement video compression coding by performing steps of prediction (including intra-frame prediction and inter-frame prediction), transform, quantization, entropy coding, and the like. In an intra-frame prediction technology, redundancy information of a current picture block is removed by using spatial pixel information of the current picture block, to obtain a residual; in an inter-frame prediction technology, redundancy information of a current picture block is removed by using pixel information of a coded or decoded picture adjacent to a current picture block, to obtain a residual. This coding framework shows high viability, and therefore, HEVC still uses this block-based hybrid video coding framework.

In the prior art, a method for predicting a pixel value of a current picture block based on a non-local means filtering technology is provided. After all templates matching a current template are obtained by searching reference pictures, a predicted pixel value of a current picture block is obtained by using an average of pixel values of picture blocks corresponding to the all templates. However, in a test and practice process, it is found that, sometimes, prediction accuracy in an existing prediction technology is relatively low, and consequently, this is likely to affect video coding and decoding quality.

SUMMARY

Embodiments of the present application provide a picture prediction method and a related apparatus, so as to improve picture prediction accuracy.

A first aspect of the present application provides a picture prediction method, including:

determining N templates whose degrees of matching with a current template meet a preset condition, where the current template is a template corresponding to a current picture block, N is a positive integer, and the N templates are obtained by searching reference pictures of the current picture block;

determining a weight of a pixel area in a picture block corresponding to each template in the N templates, where weights of at least two pixel areas in a picture block corresponding to at least one template in the N templates are different; and calculating a predicted pixel value of a pixel area in the current picture block based on the weight and a pixel value of the pixel area in the picture block corresponding to each template in the N templates, where the pixel area includes at least one pixel.

With reference to the first aspect, in a first possible implementation manner of the first aspect, the determining a weight of a pixel area in a picture block corresponding to each template in the N templates includes:

determining a weight of each template in the N templates according to a degree of matching between each template in the N templates and the current template; and determining, based on the weight of each template in the N templates and a parameter about a similarity between each template in the N templates and the pixel area in the corresponding picture block, the weight of the pixel area in the picture block corresponding to each template in the N templates.

With reference to the first possible implementation manner of the first aspect, in a second possible implementation manner of the first aspect, the parameter about the similarity between each template in the N templates and the pixel area in the corresponding picture block includes: a distance between a determined pixel area in each template in the N templates and the pixel area in the corresponding picture block; and/or a ratio of an average or a weighted average of pixel values of a determined pixel area in each template in the N templates to the pixel value of the pixel area in the corresponding picture block or an absolute difference between an average or a weighted average of pixel values of a determined pixel area in each template in the N templates and the pixel value of the pixel area in the corresponding picture block.

With reference to the first possible implementation manner of the first aspect, or the second possible implementation manner of the first aspect, in a third possible implementation manner of the first aspect, the determining a weight of each template in the N templates according to a degree of matching between each template in the N templates and the current template includes: determining the weight of each template in the N templates based on the following formula and according to the degree of matching between each template in the N templates and the current template:

$$w_m = a^{-(E_{(T_x, T_m)}/S) \times \sigma},$$

where $E_{(T_x, T_m)}$ represents distortion between the current template $T_x$ and a template $T_m$ in the N templates, S represents a quantity of pixel areas in the current template $T_x$, $\sigma$ represents a template scaling factor, a and $\sigma$ are real numbers greater than 0, $w_m$ represents a weight of the template $T_m$, and the template $T_m$ is any template in the N templates.

With reference to any one of the first to the third possible implementation manners of the first aspect, in a fourth possible implementation manner of the first aspect, the determining, based on the weight of each template in the N templates and a parameter about a similarity between each template in the N templates and the pixel area in the corresponding picture block, the weight of the pixel area in the picture block corresponding to each template in the N templates includes: determining, based on the following formula and based on the weight of each template in the N templates and the parameter about the similarity between each template in the N templates and the pixel area in the corresponding picture block, the weight of the pixel area in the picture block corresponding to each template in the N templates:

$$W_m(i,j) = W_m^{-1/\partial(R(i,j))},$$

where $w_m(i,j)$ represents a weight of a pixel area whose coordinates are (i,j) and that is in a picture block m corresponding to the template $T_m$ in the N templates, R(i,j) represents a parameter about a similarity between the pixel area whose coordinates are (i,j) and that is in the picture block m and the template $T_m$, and $\partial(R(i,j))$ represents a pixel area scaling factor corresponding to R(i,j).

With reference to the fourth possible implementation manner of the first aspect, in a fifth possible implementation manner of the first aspect, there is a linear relationship or a non-linear relationship between $\partial(R(i,j))$ and R(i,j).

With reference to the fifth possible implementation manner of the first aspect, in a sixth possible implementation manner of the first aspect, the linear relationship between $\partial(R(i,j))$ and R(i,j) is: $\partial(R(i,j))=\beta*R(i,j)$, where β is a scaling coefficient, and β is a real number greater than 0.

With reference to the fifth possible implementation manner of the first aspect, in a seventh possible implementation manner of the first aspect, the non-linear relationship between $\partial(R(i,j))$ and R(i,j) is: a value of $\partial(R(i,j))$ is determined based on a distance interval within which R(i,j) falls, and different distance intervals correspond to pixel area scaling factors with different values.

With reference to the seventh possible implementation manner of the first aspect, in an eighth possible implementation manner of the first aspect, the non-linear relationship between $\partial(R(i,j))$ and R(i,j) is:

$$\partial(d(i,j)) = \begin{cases} a1, & d(i,j) \le b1 \\ a2, & b1 < d(i,j) \le b2 \\ a3, & d(i,j) > b2 \end{cases},$$

where a1 is less than a2, a2 is less than a3, and b1 is less than b2; and a1, a2, a3, b1, and b2 are real numbers greater than 0; or the non-linear relationship between $\partial(R(i,j))$ and R(i,j) is:

$$\partial(d(i,j)) = \begin{cases} a4, & d(i,j) \le b3 \\ a5, & b3 < d(i,j) \le b4 \\ a6, & b4 < d(i,j) \le b5 \\ a7, & d(i,j) > b5 \end{cases},$$

where a4 is less than a5, a5 is less than a6, a6 is less than a7, b3 is less than b4, and b4 is less than b5; and a4, a5, a6, a7, b3, b4, and b5 are real numbers greater than 0; or the non-linear relationship between $\partial(R(i,j))$ and R(i,j) is:

$$\partial(d(i,j)) = \begin{cases} a8, & d(i,j) \le b6 \\ a9, & d(i,j) > b6 \end{cases},$$

where a8 is less than a9, and a8, a9, and b6 are real numbers greater than 0.

With reference to any one of the fourth to the eighth possible implementation manners of the first aspect, in a ninth possible implementation manner of the first aspect, R(i,j) is equal to d(i,j) or e(i,j) d(i,j) represents a distance between the pixel area whose coordinates are (i,j) and that is in the picture block m and a determined pixel area in the template $T_m$, and e(i,j) represents a ratio of a pixel value of the pixel area whose coordinates are (i,j) and that is in the picture block m to an average pixel value or a weighted average pixel value of the template $T_m$ or an absolute difference between a pixel value of the pixel area whose coordinates are (i,j) and that is in the picture block m and an average pixel value or a weighted average pixel value of the template $T_m$.

With reference to the ninth possible implementation manner of the first aspect, in a tenth possible implementation manner of the first aspect, d(i,j) represents a distance between the pixel area whose coordinates are (i,j) and that is in the picture block m and an upper left pixel in the template $T_m$, or d(i,j) represents a distance between the pixel area whose coordinates are (i,j) and that is in the picture block m and a pixel y in the template $T_m$; and the distance between the pixel area whose coordinates are (i,j) and that is in the picture block m and the pixel y in the template $T_m$ is less than or equal to a distance between the pixel area whose coordinates are (i,j) and that is in the picture block m and any pixel in the template $T_m$ except the pixel y.

With reference to any one of the first aspect, or the first to the tenth possible implementation manners of the first aspect, in an eleventh possible implementation manner of the first aspect, the calculating a predicted pixel value of a pixel area in the current picture block based on the weight and a pixel value of the pixel area in the picture block corresponding to each template in the N templates includes: calculating the predicted pixel value of the pixel area in the current picture block by using the following formula and based on the weight and the pixel value of the pixel area in the picture block corresponding to each template in the N templates:

$$pre(i,j) = \frac{\sum_{m=1}^{N}(w_m(i,j)p_m(i,j))}{\sum_{m=1}^{N}w_m(i,j)},$$

where $w(i,j)$ represents the weight of the pixel area whose coordinates are (i,j) and that is in the picture block m corresponding to the template $T_m$ in the N templates, $p_m(i,j)$ represents the pixel value of the pixel area whose coordinates are (i,j) and that is in the picture block m, and pre(i,j)

represents a predicted pixel value of a pixel area whose coordinates are (i,j) and that is in the current picture block.

With reference to any one of the first aspect, or the first to the eleventh possible implementation manners of the first aspect, in a twelfth possible implementation manner of the first aspect, the determining N templates whose degrees of matching with a current template meet a preset condition includes:

determining M templates with a highest degree of matching with the current template; and determining, from the M templates, N templates that meet the preset condition, where N is less than M.

With reference to the twelfth possible implementation manner of the first aspect, in a thirteenth possible implementation manner of the first aspect, the determining, from the M templates, N templates that meet the preset condition includes: determining N templates from the M templates, where distortion between pixel values of the N templates and a pixel value of the current template is less than or equal to a threshold.

With reference to the thirteenth possible implementation manner of the first aspect, in a fourteenth possible implementation manner of the first aspect, the threshold is equal to average distortion between the pixel value of the current template and pixel values of the M templates, or the threshold is equal to an adjustment value of average distortion between the pixel value of the current template and pixel values of the M templates.

With reference to any one of the first aspect, or the first to the fourteenth possible implementation manners of the first aspect, in a fifteenth possible implementation manner of the first aspect, the picture prediction method is applied in a video coding process, or the picture prediction method is applied in a video decoding process.

A second aspect of the present application provides a picture prediction apparatus, including:

a first determining unit, configured to determine N templates whose degrees of matching with a current template meet a preset condition, where the current template is a template corresponding to a current picture block, N is a positive integer, and the N templates are obtained by searching reference pictures of the current picture block;

a second determining unit, configured to determine a weight of a pixel area in a picture block corresponding to each template in the N templates, where weights of at least two pixel areas in a picture block corresponding to at least one template in the N templates are different; and a predicting unit, configured to calculate a predicted pixel value of a pixel area in the current picture block based on the weight and a pixel value of the pixel area in the picture block corresponding to each template in the N templates, where the pixel area includes at least one pixel.

With reference to the second aspect, in a first possible implementation manner of the second aspect, the second determining unit includes:

a first determining subunit, configured to determine a weight of each template in the N templates according to a degree of matching between each template in the N templates and the current template; and a second determining subunit, configured to determine, based on the weight of each template in the N templates and a parameter about a similarity between each template in the N templates and the pixel area in the corresponding picture block, the weight of the pixel area in the picture block corresponding to each template in the N templates.

With reference to the first possible implementation manner of the second aspect, in a second possible implementation manner of the second aspect, the parameter about the similarity between each template in the N templates and the pixel area in the corresponding picture block includes: a distance between a determined pixel area in each template in the N templates and the pixel area in the corresponding picture block; and/or a ratio of an average or a weighted average of pixel values of a determined pixel area in each template in the N templates to the pixel value of the pixel area in the corresponding picture block or an absolute difference between an average or a weighted average of pixel values of a determined pixel area in each template in the N templates and the pixel value of the pixel area in the corresponding picture block.

With reference to the first possible implementation manner of the second aspect, or the second possible implementation manner of the second aspect, in a third possible implementation manner of the second aspect, the first determining subunit is specifically configured to determine the weight of each template in the N templates based on the following formula and according to the degree of matching between each template in the N templates and the current template:

$$w_m = a^{-(E_{(T_x,T_m)}/S) \times \sigma},$$

where $E_{(T_x,T_m)}$ represents distortion between the current template $T_x$ and a template $T_m$ in the N templates, S represents a quantity of pixel areas in the current template $T_x$, σ represents a template scaling factor, a and σ are real numbers greater than 0, $w_m$ represents a weight of the template $T_m$, and the template $T_m$ is any template in the N templates.

With reference to any one of the first to the third possible implementation manners of the second aspect, in a fourth possible implementation manner of the second aspect, the second determining subunit is specifically configured to determine, based on the following formula and based on the weight of each template in the N templates and the parameter about the similarity between each template in the N templates and the pixel area in the corresponding picture block, the weight of the pixel area in the picture block corresponding to each template in the N templates:

$$W_m(i,j) = W_m^{-1/\partial(R(i,j))},$$

where $W_m(i,j)$ represents a weight of a pixel area whose coordinates are (i,j) and that is in a picture block m corresponding to the template $T_m$ in the N templates, $R(i,j)$ represents a parameter about a similarity between the pixel area whose coordinates are (i,j) and that is in the picture block m and the template $T_m$, and $\partial(R(i,j))$ represents a pixel area scaling factor corresponding to $R(i,j)$.

With reference to the fourth possible implementation manner of the second aspect, in a fifth possible implementation manner of the second aspect, there is a linear relationship or a non-linear relationship between $\partial(R(i,j))$ and $R(i,j)$.

With reference to the fifth possible implementation manner of the second aspect, in a sixth possible implementation manner of the second aspect, the linear relationship between $\partial(R(i,j))$ and $R(i,j)$ is: $\partial(R(i,j))=\beta*R(i,j)$, where β is a scaling coefficient, and β is a real number greater than 0.

With reference to the fifth possible implementation manner of the second aspect, in a seventh possible implementation manner of the second aspect, the non-linear relationship between $\partial(R(i,j))$ and $R(i,j)$ is: a value of $\partial(R(i,j))$ is determined based on a distance interval within which $R(i,j)$ falls, and different distance intervals correspond to pixel area scaling factors with different values.

With reference to the seventh possible implementation manner of the second aspect, in an eighth possible implementation manner of the second aspect, the non-linear relationship between $\partial(R(i,j))$ and $R(i,j)$ is:

$$\partial(d(i,j)) = \begin{cases} a1, & d(i,j) \le b1 \\ a2, & b1 < d(i,j) \le b2 \\ a3, & d(i,j) > b2 \end{cases},$$

where a1 is less than a2, a2 is less than a3, and b1 is less than b2; and a1, a2, a3, b1, and b2 are real numbers greater than 0; or the non-linear relationship between $\partial(R(i,j))$ and $R(i,j)$ is:

$$\partial(d(i,j)) = \begin{cases} a4, & d(i,j) \le b3 \\ a5, & b3 < d(i,j) \le b4 \\ a6, & b4 < d(i,j) \le b5 \\ a7, & d(i,j) > b5 \end{cases},$$

where a4 is less than a5, a5 is less than a6, a6 is less than a7, b3 is less than b4, and b4 is less than b5; and a4, a5, a6, a7, b3, b4, and b5 are real numbers greater than 0; or the non-linear relationship between $\partial(R(i,j))$ and $R(i,j)$ is:

$$\partial(d(i,j)) = \begin{cases} a8, & d(i,j) \le b6 \\ a9, & d(i,j) > b6 \end{cases},$$

where a8 is less than a9, and a8, a9, and b6 are real numbers greater than 0.

With reference to any one of the fourth to the eighth possible implementation manners of the second aspect, in a ninth possible implementation manner of the second aspect, $R(i,j)$ is equal to $d(i,j)$ or $e(i,j)$ $d(i,j)$ represents a distance between the pixel area whose coordinates are $(i,j)$ and that is in the picture block m and a determined pixel area in the template $T_m$, and $e(i,j)$ represents a ratio of a pixel value of the pixel area whose coordinates are $(i,j)$ and that is in the picture block m to an average pixel value or a weighted average pixel value of the template $T_m$, or an absolute difference between a pixel value of the pixel area whose coordinates are $(i,j)$ and that is in the picture block m and an average pixel value or a weighted average pixel value of the template $T_m$.

With reference to the ninth possible implementation manner of the second aspect, in a tenth possible implementation manner of the second aspect, $d(i,j)$ represents a distance between the pixel area whose coordinates are $(i,j)$ and that is in the picture block m and an upper left pixel in the template $T_m$ or $d(i,j)$ represents a distance between the pixel area whose coordinates are $(i,j)$ and that is in the picture block m and a pixel y in the template $T_m$; and the distance between the pixel area whose coordinates are $(i,j)$ and that is in the picture block m and the pixel y in the template $T_m$ is less than or equal to a distance between the pixel area whose coordinates are $(i,j)$ and that is in the picture block m and any pixel in the template $T_m$ except the pixel y.

With reference to any one of the second aspect, or the first to the tenth possible implementation manners of the second aspect, in an eleventh possible implementation manner of the second aspect, the predicting unit is specifically configured to calculate the predicted pixel value of the pixel area in the current picture block by using the following formula and based on the weight and the pixel value of the pixel area in the picture block corresponding to each template in the N templates:

$$pre(i,j) = \frac{\sum_{m=1}^{N}(w_m(i,j)p_m(i,j))}{\sum_{m=1}^{N} w_m(i,j)},$$

where $w_m(i,j)$ represents the weight of the pixel area whose coordinates are $(i,j)$ and that is in the picture block m corresponding to the template $T_m$ in the N templates, $p_m(i,j)$ represents the pixel value of the pixel area whose coordinates are $(i,j)$ and that is in the picture block m, and $pre(i,j)$ represents a predicted pixel value of a pixel area whose coordinates are $(i,j)$ and that is in the current picture block.

With reference to any one of the second aspect, or the first to the eleventh possible implementation manners of the second aspect, in a twelfth possible implementation manner of the second aspect, the first determining unit is specifically configured to: determine M templates with a highest degree of matching with the current template; and determine, from the M templates, N templates that meet the preset condition, where N is less than M.

With reference to the twelfth possible implementation manner of the second aspect, in a thirteenth possible implementation manner of the second aspect, the first determining unit is specifically configured to: determine the M templates with the highest degree of matching with the current template; and determine N templates from the M templates, where distortion between pixel values of the N templates and a pixel value of the current template is less than or equal to a threshold.

With reference to the thirteenth possible implementation manner of the second aspect, in a fourteenth possible implementation manner of the second aspect, the threshold is equal to average distortion between the pixel value of the current template and pixel values of the M templates, or the threshold is equal to an adjustment value of average distortion between the pixel value of the current template and pixel values of the M templates.

With reference to any one of the second aspect, or the first to the fourteenth possible implementation manners of the second aspect, in a fifteenth possible implementation manner of the second aspect, the picture prediction apparatus is applied to a video coding apparatus, or the picture prediction apparatus is applied to a video decoding apparatus.

It can be learned that, in the solutions in the embodiments of the present application, after N templates whose degrees of matching with a current template meet a preset condition are determined, a weight of a pixel area in a picture block corresponding to each template in the N templates is determined, and a predicted pixel value of a pixel area in the current picture block is calculated based on the weight and a pixel value of the pixel area in the picture block corresponding to each template in the N templates. The pixel area includes at least one pixel. Weights of at least two pixel areas in a picture block corresponding to at least one template in the determined N templates are different, that is, weights of at least two pixel areas in a picture block corresponding to a same template are different. Therefore, a conventional-art solution in which weights of all pixel areas in picture blocks corresponding to all templates are the same (where the weights are all equal to 1) is abandoned. Because there is a specific difference between weights of pixel areas, this is more likely to conform to an actual correlation difference. In this way, a pixel value of a pixel area in a current picture block is accurately predicted, and video coding and decoding efficiency are improved.

BRIEF DESCRIPTION OF DRAWINGS

To describe the technical solutions in the embodiments of the present application more clearly, the following briefly describes the accompanying drawings required for describing the embodiments or the prior art. Apparently, the accompanying drawings in the following description show merely some embodiments of the present application, and persons of ordinary skill in the art may still derive other drawings from these accompanying drawings without creative efforts.

FIG. 1-a is a schematic diagram of a prediction unit division manner corresponding to intra-frame prediction according to an embodiment of the present application;

FIG. 1-b is a schematic diagram of several prediction unit division manners corresponding to inter-frame prediction according to an embodiment of the present application;

FIG. 1-c is a schematic flowchart of a picture prediction method according to an embodiment of the present application;

FIG. 1-d is a schematic diagram of a location relationship between a picture block and a template according to an embodiment of the present application;

DESCRIPTION OF EMBODIMENTS

Figure 2:
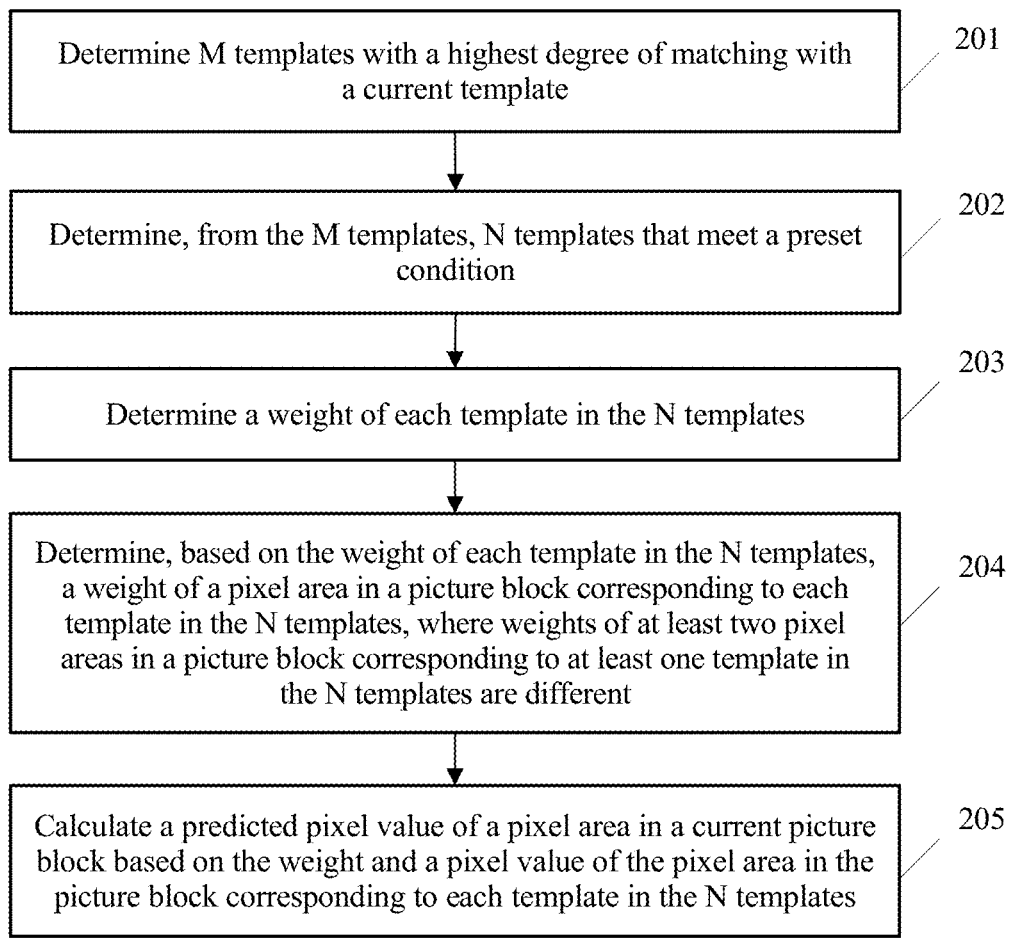
FIG. 2 is a schematic flowchart of another picture prediction method according to an embodiment of the present application.

Embodiments of the present application provide a picture prediction method and a related apparatus, so as to improve picture prediction accuracy.

To make persons skilled in the art understand the technical solutions in the present application better, the following clearly describes the technical solutions in the embodiments of the present application with reference to the accompanying drawings in the embodiments of the present application. Apparently, the described embodiments are merely some rather than all of the embodiments of the present application. All other embodiments obtained by persons of ordinary skill in the art based on the embodiments of the present application without creative efforts shall fall within the protection scope of the present application.

Details are separately described in the following.

In the specification, claims, and accompanying drawings of the present application, terms "first", "second", "third", "fourth", and the like are intended to distinguish between different objects but do not indicate a particular order. In addition, terms "include", "have", and any other variant thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

The following first describes some concepts that may be involved in the embodiments of the present application.

In most coding frameworks, a video sequence includes a series of pictures, the pictures are further divided into slices, and the slices are further divided into blocks. Video coding is to perform coding processing from left to right and from top to bottom row by row starting from an upper left corner position of a picture by using a block as a unit. In some new video coding standards, a concept of a block is further extended. There is a macroblock (MB) in the H.264 standard, and the MB may be further divided into multiple prediction blocks that may be used for predictive coding. In the HEVC standard, basic concepts such as a coding unit (CU), a prediction unit (PU), and a transform unit (TU) are used, and multiple units are classified according to functions, and a completely new tree-based structure is used for description. For example, the CU may be divided into smaller CUs according to a quadtree, and the smaller CU may be further divided to form a quadtree structure. The PU and the TU also have similar tree structures. Regardless of whether a unit is a CU, a PU, or a TU, the unit belongs to the concept of a block in essence. The CU is similar to a macroblock MB or a coding block, and is a basic unit for partitioning and coding a picture. The PU may correspond to a prediction block, and is a basic unit for predictive coding. The CU is further divided into multiple PUs according to a division mode. The TU may correspond to a transform block, and is a basic unit for transforming a prediction residual.

In the HEVC standard, a size of the coding unit may include four levels: 64×64, 32×32, 16×16, and 8×8. Coding units at each level may be divided into prediction units of different sizes according to intra-frame prediction and inter-frame prediction. For example, as shown in FIG. 1-a and FIG. 1-b, FIG. 1-a shows a prediction unit division manner corresponding to intra-frame prediction. FIG. 1-b shows several prediction unit division manners corresponding to inter-frame prediction.

In a development and evolution process of a video coding technology, video coding experts figure out various methods to use temporal and spatial correlation between adjacent coding/decoding blocks to try to improve coding efficiency. In the H264/Advanced Video Coding (AVC) standard, a skip mode and a direct mode become effective tools for improving coding efficiency. Blocks of the two coding modes used when a bit rate is low can occupy more than a half of an entire coding sequence. When the skip mode is used, a motion vector of a current picture block can be derived by using nearby motion vectors only by adding a skip mode flag to a bit stream, and a value of a reference block is directly copied according to the motion vector as a reconstructed value of the current picture block. In addition, when the direct mode is used, an encoder may derive the motion vector of the current picture block by using the adjacent motion vectors, and directly copy the value of the reference block according to the motion vector as a predicted value of the current picture block, and perform predictive coding on the current picture block by using the predicted value in an encoder. In the evolved HEVC standard, some new coding tools are introduced to further improve video coding efficiency. A merge coding mode and an advanced motion vector prediction (AMVP) mode are two important inter-frame prediction tools. During merge coding, a candidate motion information set is constructed by using motion information (including a prediction direction, a motion vector, and a reference picture index) of an adjacent coded block of a current coding block, candidate motion information that enables coding efficiency to be the highest may be selected as motion information of the current coding block by means of comparison, a predicted value of the current coding block is found in reference pictures, predictive coding is performed on the current coding block, and an index value that indicates an adjacent coded block whose motion information is selected is written into a bitstream. When the advanced motion vector prediction mode is used, a motion vector of an adjacent coded block is used as a motion vector predicted value of a current coding block, a motion vector that enables coding efficiency to be the highest may be selected to predict a motion vector of the current coding block, and an index value that indicates an adjacent coded block whose motion vector is selected may be written into a video bitstream.

The technical solutions in the embodiments of the present application are further discussed in the following.

A picture prediction method provided in the embodiments of the present application is first described in the following. The picture prediction method provided in the embodiments of the present application is executed by a video coding apparatus or a video decoding apparatus. The video coding apparatus or the video decoding apparatus may be any apparatus that needs to output or store a video, for example, a device such as a laptop computer, a tablet computer, a personal computer, a mobile phone, or a video server.

In an embodiment of a picture prediction method of the present application, the picture prediction method includes: determining N templates whose degrees of matching with a current template meet a preset condition, where the current template is a template corresponding to a current picture block, N is a positive integer, and the N templates are obtained by searching reference pictures of the current picture block; determining a weight of a pixel area in a picture block corresponding to each template in the N templates, where weights of at least two pixel areas in a picture block corresponding to at least one template in the N templates are different; and calculating a predicted pixel value of a pixel area in the current picture block based on the weight and a pixel value of the pixel area in the picture block corresponding to each template in the N templates, where the pixel area includes at least one pixel.

Referring to FIG. 1-c, FIG. 1-c is a schematic flowchart of a picture prediction method according to an embodiment of the present application. As shown in FIG. 1-c, the picture prediction method provided in this embodiment of the present application may include the following steps.

101. Determine N templates whose degrees of matching with a current template meet a preset condition.

The current template is a template corresponding to a current picture block. The N templates are obtained by searching reference pictures of the current picture block. N is a positive integer.

For example, N may be equal to 1, 2, 3, 4, 5, 7, 9, 12, or another value.

102. Determine a weight of a pixel area in a picture block corresponding to each template in the N templates.

Weights of at least two pixel areas in a picture block corresponding to at least one template in the N templates are different.

The pixel area mentioned in each embodiment of the present application includes at least one pixel. That is, the pixel area may be a pixel or a pixel block, and if the pixel area is a pixel block, the pixel area may have, for example, a 2×2, 1×2, 1×3, 4×2, 4×3, or 4×4 size, or another size.

The templates in the N templates correspond to different picture blocks, and therefore, the N templates correspond to N picture blocks. A template may be L-shaped or in another shape. For example, as shown in FIG. 1-d, a template corresponding to a picture block may be an L-shaped pixel area adjacent to the picture block. For example, in FIG. 1-d, an L-shaped pixel area $T_x$ adjacent to a picture block x is a template $T_x$ corresponding to the picture block x, an L-shaped pixel area $T_{m1}$ adjacent to a picture block m1 is a template $T_{m1}$ corresponding to the picture block m1, and an L-shaped pixel area $T_{m2}$ adjacent to a picture block m2 is a template $T_{m2}$ corresponding to the picture block m2. There may be no overlap area between a picture block and a template corresponding to the picture block.

For example, the weight of the pixel area in the picture block corresponding to each template in the N templates may be related to a parameter about a similarity between each template in the N templates and the pixel area in the corresponding picture block. A parameter about a similarity between two objects may be used to represent the similarity between the two objects. For example, a parameter about a similarity between a template $T_m$ in the N templates and a pixel area w in a picture block m may be used to represent the similarity between the template $T_m$ and the pixel area w in the picture block m. The picture block m is a picture block corresponding to the template $T_m$. The template $T_m$ may be any template in the N templates. The pixel area w is any pixel area in the picture block m.

In a specific example, the parameter about the similarity between the template $T_m$ and the pixel area w in the picture block m may be, for example, a distance between the pixel area w and a determined pixel area in the template $T_m$, or may be a ratio of an average or a weighted average of pixel values of a determined pixel area in the template $T_m$ to a pixel value of the pixel area w or an absolute difference between an average or a weighted average of pixel values of a determined pixel area in the template $T_m$ and a pixel value of the pixel area w. That is, there may be a correspondence between a weight of the pixel area w in the picture block m corresponding to the template $T_m$ and the distance between the pixel area w and the determined pixel area in the template $T_m$. Alternatively, there may be a correspondence between a weight of the pixel area w in the picture block m corresponding to the template $T_m$ in the N templates and the ratio of the average or the weighted average of the pixel values of the determined pixel area in the template $T_m$ to the pixel value of the pixel area w or the absolute difference between the average or the weighted average of the pixel values of the determined pixel area in the template $T_m$ and the pixel value of the pixel area w.

A template corresponding to a picture block is some of adjacent reconstructed pixels of the picture block, and has a correspondence with the picture block. The template corresponding to the picture block may be used to represent the picture block for searching and matching. A picture block corresponding to a matching template may be found for an operation such as prediction by using a correspondence between the template and the picture block.

Optionally, in some possible implementation manners of the present application, the determined pixel area in the foregoing template $T_m$ may be, for example, an upper left pixel, an upper left pixel area, a lower left pixel, a lower left pixel area, an upper right pixel, an upper right pixel area, a lower right pixel, a lower right pixel area, a center pixel area, a center pixel, or another pixel area in the template $T_m$.

The upper left pixel area in the template $T_m$ is the upper left pixel in the template $T_m$ or a pixel block that is in the template $T_m$ and that includes the upper left pixel in the template $T_m$; the lower left pixel area in the template $T_m$ is the lower left pixel in the template $T_m$ or a pixel block that is in the template $T_m$ and that includes the lower left pixel in the template $T_m$; the upper right pixel area in the template $T_m$ is the upper right pixel in the template $T_m$ or a pixel block that is in the template $T_m$ and that includes the upper right pixel in the template $T_m$; the center pixel area in the template $T_m$ is the center pixel in the template $T_m$ or a pixel block that is in the template $T_m$ and that includes the center pixel in the template $T_m$.

The distance between the pixel area w and the determined pixel area in the template $T_m$ may be, for example, a distance between a pixel in the pixel area w and a pixel in the determined pixel area in the template $T_m$, where the two pixels are closest to each other, or the distance between the pixel area w and the determined pixel area in the template $T_m$ may be a distance between any pixel in the pixel area w and any pixel in the determined pixel area in the template $T_m$, or the distance between the pixel area w and the determined pixel area in the template $T_m$ may be a distance between a determined pixel in the pixel area w (where the determined pixel in the pixel area w may be an upper left pixel, a lower left pixel, an upper right pixel, a lower right pixel, or a center pixel in the pixel area w) and a determined pixel in the determined pixel area in the template $T_m$ (where the determined pixel in the template $T_m$ is, for example, the upper left pixel, the lower left pixel, the upper right pixel, the lower right pixel, or the center pixel in the template $T_m$). Certainly, the distance between the pixel area w and the determined pixel area in the template $T_m$ may be calculated in another manner.

103. Calculate a predicted pixel value of a pixel area in the current picture block based on the weight and a pixel value of the pixel area in the picture block corresponding to each template in the N templates.

It can be learned that, in the picture prediction solution in this embodiment, after N templates whose degrees of matching with a current template meet a preset condition are determined, a weight of a pixel area in a picture block corresponding to each template in the N templates is determined, and a predicted pixel value of a pixel area in the current picture block is calculated based on the weight and a pixel value of the pixel area in the picture block corresponding to each template in the N templates. The pixel area includes at least one pixel. Weights of at least two pixel areas in a picture block corresponding to at least one template in the determined N templates are different, that is, weights of at least two pixel areas in a picture block corresponding to a same template are different. Therefore, a conventional-art solution in which weights of all pixel areas in picture blocks corresponding to all templates are the same (where the weights are all equal to 1) is abandoned. Because there is a specific difference between weights of pixel areas, this is more likely to conform to an actual correlation difference. In this way, a pixel value of a pixel area in a current picture block is accurately predicted, and video coding and decoding efficiency are improved.

Optionally, in some possible implementation manners of the present application, the determining N templates whose degrees of matching with a current template meet a preset condition includes: determining N templates with a highest degree of matching with the current template; or determining M templates with a highest degree of matching with the current template, and determining, from the M templates, N templates that meet the preset condition, where N is less than M.

For example, the determining, from the M templates, N templates that meet the preset condition includes: determining N templates from the M templates, where distortion between pixel values of the N templates and a pixel value of the current template is less than or equal to a threshold. For example, the threshold is equal to average distortion between the pixel value of the current template and pixel values of the M templates, or the threshold is equal to an adjustment value of average distortion between the pixel value of the current template and pixel values of the M templates. Certainly, the threshold may be another preset value. It can be understood that a screening threshold is introduced to help obtain, by means of screening, a template that is with a relatively low matching degree and that is not involved in an operation, so that prediction accuracy is improved, and operation complexity is reduced.

There may be diverse manners of determining the weight of the pixel area in the picture block corresponding to each template in the N templates.

For example, the determining a weight of a pixel area in a picture block corresponding to each template in the N templates may include: determining a weight of each template in the N templates according to a degree of matching between each template in the N templates and the current template; and determining, based on the weight of each template in the N templates and a parameter about a similarity between each template in the N templates and the pixel area in the corresponding picture block, the weight of the pixel area in the picture block corresponding to each template in the N templates.

Optionally, in some possible implementation manners of the present application, the parameter about the similarity between each template in the N templates and the pixel area in the corresponding picture block may include: a distance between a determined pixel area in each template in the N templates and the pixel area in the corresponding picture block; and/or a ratio of an average or a weighted average of pixel values of a determined pixel area in each template in the N templates to the pixel value of the pixel area in the corresponding picture block or an absolute difference between an average or a weighted average of pixel values of a determined pixel area in each template in the N templates and the pixel value of the pixel area in the corresponding picture block.

Optionally, in some possible implementation manners of the present application, the determining a weight of each template in the N templates according to a degree of matching between each template in the N templates and the current template may include: determining the weight of each template in the N templates based on the following formula and according to the degree of matching between each template in the N templates and the current template:

$$w_m = a^{-(E_{(T_x,T_m)}/S) \times \sigma},$$

where $E_{(T_x,T_m)}$ represents distortion between the current template $T_x$ and a template $T_m$ in the N templates, S represents a quantity of pixel areas in the current template $T_x$, σ represents a template scaling factor, a and σ are real numbers greater than 0, $w_m$ represents a weight of the template $T_m$, and the template $T_m$ is any template in the N templates. When a value of a is, for example, an integer such as 2, 3, or 4, operation complexity is simplified.

Optionally, in some possible implementation manners of the present application, the determining, based on the weight of each template in the N templates and a parameter about a similarity between each template in the N templates and the pixel area in the corresponding picture block, the weight of the pixel area in the picture block corresponding to each template in the N templates may include: determining, based on the following formula and based on the weight of each template in the N templates and the parameter about the similarity between each template in the N templates and the pixel area in the corresponding picture block, the weight of the pixel area in the picture block corresponding to each template in the N templates:

$$W_m(i,j) = W_m^{-1/\partial(R(i,j))},$$

where $W(i,j)$ represents a weight of a pixel area whose coordinates are (i,j) and that is in a picture block m corresponding to the template $T_m$ in the N templates, R(i,j) represents a parameter about a similarity between the pixel area whose coordinates are (i,j) and that is in the picture block m and the template $T_m$, and ∂(R(i,j)) represents a pixel area scaling factor corresponding to R(i,j).

Optionally, in some possible implementation manners of the present application, there is a linear relationship or a non-linear relationship between ∂(R(i,j)) and R(i,j).

For example, the linear relationship between ∂(R(i,j)) and R(i,j) is:

$$\partial(R(i,j)) = \beta * R(i,j),$$

where β is a scaling coefficient, and β is a real number greater than 0.

For example, the non-linear relationship between ∂(R(i,j)) and R(i,j) is: a value of ∂(R(i,j)) is determined based on a distance interval within which R(i,j) falls, and different distance intervals correspond to pixel area scaling factors with different values.

For example, the non-linear relationship between ∂(R(i,j)) and R(i,j) may be:

$$\partial(d(i,j)) = \begin{cases} a1, & d(i,j) \le b1 \\ a2, & b1 < d(i,j) \le b2 \\ a3, & d(i,j) > b2 \end{cases}, \text{ where}$$

a1 is less than a2, a2 is less than a3, and b1 is less than b2; and a1, a2, a3, b1, and b2 are real numbers greater than 0.

For example, a1=0.3, a2=0.5, and a3=1. For example, b1=4, and b2=8.

For another example, the non-linear relationship between ∂(R(i,j)) and R(i,j) may be:

$$\partial(d(i,j)) = \begin{cases} a4, & d(i,j) \le b3 \\ a5, & b3 < d(i,j) \le b4 \\ a6, & b4 < d(i,j) \le b5 \\ a7, & d(i,j) > b5 \end{cases},$$

where a4 is less than a5, a5 is less than a6, a6 is less than a7, b3 is less than b4, and b4 is less than b5; and a4, a5, a6, a7, b3, b4, and b5 are real numbers greater than 0.

For example, a4=0.3, a5=0.5, a6=0.8, and a7=1. For example, b3=4, b4=5, and b5=6.

For another example, the non-linear relationship between ∂(R(i,j)) and R(i,j) may be:

$$\partial(d(i,j)) = \begin{cases} a8, & d(i,j) \le b6 \\ a9, & d(i,j) > b6 \end{cases},$$

where a8 is less than a9, and a8, a9, and b6 are real numbers greater than 0.

For example, a8=0.5, and a9=1. For example, b6=5.

The foregoing examples show that the non-linear relationship between ∂(R(i,j)) and R(i,j) may be a piecewise function relationship. A piecewise quantity of a piecewise function may not be limited to 2, 3, or 4 shown in the foregoing examples, and certainly, may be larger.

Optionally, in some possible implementation manners of the present application, R(i,j) may be, for example, equal to d(i,j) or e(i,j) d(i,j) represents a distance between the pixel area whose coordinates are (i,j) and that is in the picture block m and a determined pixel area in the template $T_m$, and e(i,j) represents a ratio of a pixel value of the pixel area whose coordinates are (i,j) and that is in the picture block m to an average pixel value or a weighted average pixel value of the template $T_m$ or an absolute difference between a pixel value of the pixel area whose coordinates are (i,j) and that is in the picture block m and an average pixel value or a weighted average pixel value of the template $T_m$.

For example, d(i,j) may represent a distance between the pixel area whose coordinates are (i,j) and that is in the picture block m and an upper left pixel in the template $T_m$, or d(i,j) may represent a distance between the pixel area whose coordinates are (i,j) and that is in the picture block m and a pixel y in the template $T_m$; and the distance between the pixel area whose coordinates are (i,j) and that is in the picture block m and the pixel y in the template $T_m$ is less than or equal to a distance between the pixel area whose coordinates are (i,j) and that is in the picture block m and any pixel in the template $T_m$ except the pixel y.

Optionally, in some possible implementation manners of the present application, the calculating a predicted pixel value of a pixel area in the current picture block based on the weight and a pixel value of the pixel area in the picture block corresponding to each template in the N templates includes: calculating the predicted pixel value of the pixel area in the current picture block by using the following formula and based on the weight and the pixel value of the pixel area in the picture block corresponding to each template in the N templates:

$$pre(i, j) = \frac{\sum_{m=1}^{N}(w_m(i, j)p_m(i, j))}{\sum_{m=1}^{N}w_m(i, j)},$$

where $w_m(i,j)$ represents the weight of the pixel area whose coordinates are (i,j) and that is in the picture block m corresponding to the template $T_m$ in the N templates, $p_m(i,j)$ represents the pixel value of the pixel area whose coordinates are (i,j) and that is in the picture block m, and pre(i,j) represents a predicted pixel value of a pixel area whose coordinates are (i,j) and that is in the current picture block.

The picture prediction method provided in this embodiment may be applied in a video coding process, or may be applied in a video decoding process.

To better understand and implement the foregoing solutions in this embodiment of the present application, further descriptions are provided in the following with reference to a more specific application scenario.

Referring to FIG. 2, FIG. 2 is a schematic flowchart of another picture prediction method according to another embodiment of the present application. As shown in FIG. 2, the another picture prediction method provided in the another embodiment of the present application may include the following steps.

201. Determine M templates with a highest degree of matching with a current template.

M may be a specified value, that is, the M templates with the highest degree of matching with the current template may be selected from several candidate templates. For example, five templates with a highest degree of matching with the current template may be determined from ten candidate templates. Certainly, degrees of matching between the five templates and the current template are not necessarily equal, but a degree of matching between any template in the five templates and the current template is greater than or equal to a degree of matching between any candidate template except the five templates and the current template.

The current template is a template corresponding to a current picture block. The M templates are obtained by searching reference pictures of the current picture block. M is a positive integer.

For example, M may be equal to 2, 3, 4, 5, 7, 9, 12, or another value.

202. Determine, from the M templates, N templates that meet a preset condition.

For example, the determining, from the M templates, N templates that meet a preset condition includes: determining N templates from the M templates, where distortion between pixel values of the N templates and a pixel value of the current template is less than or equal to a threshold. For example, the threshold is equal to average distortion between the pixel value of the current template and pixel values of the M templates, or the threshold is equal to an adjustment value of average distortion between the pixel value of the current template and pixel values of the M templates. Certainly, the threshold may be another preset value. It can be understood that a screening threshold is introduced to help obtain, by means of screening, a template that is with a relatively low matching degree and that is not involved in an operation, so that prediction accuracy is improved, and operation complexity is reduced.

203. Determine a weight of each template in the N templates.

For example, the weight of each template in the N templates may be determined according to a degree of matching between each template in the N templates and the current template.

204. Determine, based on the weight of each template in the N templates, a weight of a pixel area in a picture block corresponding to each template in the N templates.

For example, the weight of the pixel area in the picture block corresponding to each template in the N templates may be determined based on the weight of each template in the N templates and a parameter about a similarity between each template in the N templates and the pixel area in the corresponding picture block.

Weights of at least two pixel areas in a picture block corresponding to at least one template in the N templates are different.

The pixel area mentioned in each embodiment of the present application includes at least one pixel. That is, the pixel area may be a pixel or a pixel block, and if the pixel area is a pixel block, the pixel area may have, for example, a 2×2, 1×2, 1×3, 4×2, 4×3, or 4×4 size, or another size.

The templates in the N templates correspond to different picture blocks, and therefore, the N templates correspond to N picture blocks. A template may be L-shaped or in another shape. For example, as shown in FIG. 1-d, a template corresponding to a picture block may be an L-shaped pixel area adjacent to the picture block. For example, in FIG. 1-d, an L-shaped pixel area $T_x$ adjacent to a picture block x is a template $T_x$ corresponding to the picture block x, an L-shaped pixel area $T_{m1}$ adjacent to a picture block m1 is a template $T_{m1}$ corresponding to the picture block m1, and an L-shaped pixel area $T_{m2}$ adjacent to a picture block m2 is a template $T_{m2}$ corresponding to the picture block m2. There may be no overlap area between a picture block and a template corresponding to the picture block.

For example, the weight of the pixel area in the picture block corresponding to each template in the N templates may be related to the parameter about the similarity between each template in the N templates and the pixel area in the corresponding picture block. A parameter about a similarity between two objects may be used to represent the similarity between the two objects. For example, a parameter about a similarity between a template $T_m$ in the N templates and a pixel area w in a picture block m may be used to represent the similarity between the template $T_m$ and the pixel area w in the picture block m. The picture block m is a picture block corresponding to the template $T_m$. The template $T_m$ may be any template in the N templates. The pixel area w is any pixel area in the picture block m.

In a specific example, the parameter about the similarity between the template $T_m$ and the pixel area w in the picture block m may be, for example, a distance between the pixel area w and a determined pixel area in the template $T_m$, or may be a ratio of an average or a weighted average of pixel values of a determined pixel area in the template $T_m$, to a pixel value of the pixel area w or an absolute difference between an average or a weighted average of pixel values of a determined pixel area in the template $T_m$ and a pixel value of the pixel area w. That is, there may be a correspondence between a weight of the pixel area w in the picture block m corresponding to the template $T_m$ and the distance between the pixel area w and the determined pixel area in the template $T_m$. Alternatively, there may be a correspondence between a weight of the pixel area w in the picture block m corresponding to the template $T_m$ in the N templates and the ratio of the average or the weighted average of the pixel values of the determined pixel area in the template $T_m$ to the pixel value of the pixel area w or the absolute difference between the average or the weighted average of the pixel values of the determined pixel area in the template $T_m$ and the pixel value of the pixel area w.

Optionally, in some possible implementation manners of the present application, the determined pixel area in the foregoing template $T_m$ may be, for example, an upper left pixel, an upper left pixel area, a lower left pixel, a lower left pixel area, an upper right pixel, an upper right pixel area, a lower right pixel, a lower right pixel area, a center pixel area, a center pixel, or another pixel area in the template $T_m$.

The upper left pixel area in the template $T_m$ is the upper left pixel in the template $T_m$ or a pixel block that is in the template $T_m$ and that includes the upper left pixel in the template $T_m$; the lower left pixel area in the template k is the lower left pixel in the template $T_m$ or a pixel block that is in the template $T_m$ and that includes the lower left pixel in the template $T_m$; the upper right pixel area in the template $T_m$ is the upper right pixel in the template $T_m$ or a pixel block that is in the template $T_m$ and that includes the upper right pixel in the template $T_m$; the center pixel area in the template $T_m$ is the center pixel in the template $T_m$ or a pixel block that is in the template $T_m$ and that includes the center pixel in the template $T_m$.

The distance between the pixel area w and the determined pixel area in the template $T_m$ may be, for example, a distance between a pixel in the pixel area w and a pixel in the determined pixel area in the template $T_m$, where the two pixels are closest to each other, or the distance between the pixel area w and the determined pixel area in the template $T_m$ may be a distance between any pixel in the pixel area w and any pixel in the determined pixel area in the template $T_m$, or the distance between the pixel area w and the determined pixel area in the template $T_m$ may be a distance between a determined pixel in the pixel area w (where the determined pixel in the pixel area w may be an upper left pixel, a lower left pixel, an upper right pixel, a lower right pixel, or a center pixel in the pixel area w) and a determined pixel in the determined pixel area in the template $T_m$ (where the determined pixel in the template $T_m$ is, for example, the upper left pixel, the lower left pixel, the upper right pixel, the lower right pixel, or the center pixel in the template $T_m$). Certainly, the distance between the pixel area w and the determined pixel area in the template $T_m$ may be calculated in another manner.

205. Calculate a predicted pixel value of a pixel area in the current picture block based on the weight and a pixel value of the pixel area in the picture block corresponding to each template in the N templates.

Optionally, in some possible implementation manners of the present application, the parameter about the similarity between each template in the N templates and the pixel area in the corresponding picture block may include: a distance between a determined pixel area in each template in the N templates and the pixel area in the corresponding picture block; and/or a ratio of an average or a weighted average of pixel values of a determined pixel area in each template in the N templates to the pixel value of the pixel area in the corresponding picture block or an absolute difference between an average or a weighted average of pixel values of a determined pixel area in each template in the N templates and the pixel value of the pixel area in the corresponding picture block.

Optionally, in some possible implementation manners of the present application, that the weight of each template in the N templates is determined according to the degree of matching between each template in the N templates and the current template may include: determining the weight of each template in the N templates based on the following formula and according to the degree of matching between each template in the N templates and the current template:

$$w_m = a^{-(E_{(T_x,T_m)}/S) \times \sigma},$$

where $E_{(T_x,T_m)}$ represents distortion between the current template $T_x$ and a template $T_m$ in the N templates, S represents a quantity of pixel areas in the current template $T_x$, $\sigma$ represents a template scaling factor, a and $\sigma$ are real numbers greater than 0, $w$ represents a weight of the template $T_m$, and the template $T_m$ is any template in the N templates. When a value of a is, for example, an integer such as 2, 3, or 4, operation complexity is simplified.

Optionally, in some possible implementation manners of the present application, that the weight of the pixel area in the picture block corresponding to each template in the N templates is determined based on the weight of each template in the N templates and the parameter about the similarity between each template in the N templates and the pixel area in the corresponding picture block may include: determining, based on the following formula and based on the weight of each template in the N templates and the parameter about the similarity between each template in the N templates and the pixel area in the corresponding picture block, the weight of the pixel area in the picture block corresponding to each template in the N templates:

$$W_m(i,j) = W_m^{-1/\partial(R(i,j))},$$

where $W_m(i,j)$ represents a weight of a pixel area whose coordinates are (i,j) and that is in a picture block m corresponding to the template $T_m$ in the N templates, R(i,j) represents a parameter about a similarity between the pixel area whose coordinates are (i,j) and that is in the picture block m and the template $T_m$, and $\partial(R(i,j))$ represents a pixel area scaling factor corresponding to R(i,j).

Optionally, in some possible implementation manners of the present application, there is a linear relationship or a non-linear relationship between $\partial(R(i,j))$ and R(i,j).

For example, the linear relationship between $\partial(R(i,j))$ and R(i,j) is:

$$\partial(R(i,j)) = \beta * R(i,j),$$

where $\beta$ is a scaling coefficient, and $\beta$ is a real number greater than 0.

For example, the non-linear relationship between $\partial(R(i,j))$ and R(i,j) is: a value of $\partial(R(i,j))$ is determined based on a distance interval within which R(i,j) falls, and different distance intervals correspond to pixel area scaling factors with different values.

For example, the non-linear relationship between $\partial(R(i,j))$ and R(i,j) may be:

$$\partial(d(i,j)) = \begin{cases} a1, & d(i,j) \leq b1 \\ a2, & b1 < d(i,j) \leq b2, \\ a3, & d(i,j) > b2 \end{cases}$$

where a1 is less than a2, a2 is less than a3, and b1 is less than b2; and a1, a2, a3, b1, and b2 are real numbers greater than 0.

For another example, the non-linear relationship between ∂(R(i,j)) and R(i,j) may be:

$$\partial(d(i, j)) = \begin{cases} a4, & d(i, j) \le b3 \\ a5, & b3 < d(i, j) \le b4 \\ a6, & b4 < d(i, j) \le b5 \\ a7, & d(i, j) > b5 \end{cases},$$

a4 is less than a5, a5 is less than a6, a6 is less than a7, b3 is less than b4, and b4 is less than b5; and a4, a5, a6, a7, b3, b4, and b5 are real numbers greater than 0.

For another example, the non-linear relationship between ∂(R(i,j)) and R(i,j) may be:

$$\partial(d(i, j)) = \begin{cases} a8, & d(i, j) \le b6 \\ a9, & d(i, j) > b6 \end{cases},$$

where a8 is less than a9, and a8, a9, and b6 are real numbers greater than 0.

The foregoing examples show that the non-linear relationship between ∂(R(i,j)) and R(i,j) may be a piecewise function relationship. A piecewise quantity of a piecewise function may not be limited to 2, 3, or 4 shown in the foregoing examples, and certainly, may be larger.

Optionally, in some possible implementation manners of the present application, R(i,j) may be, for example, equal to d(i,j) or e(i,j) d(i,j) represents a distance between the pixel area whose coordinates are (i,j) and that is in the picture block m and a determined pixel area in the template $T_m$, and e(i,j) represents a ratio of a pixel value of the pixel area whose coordinates are (i,j) and that is in the picture block m to an average pixel value or a weighted average pixel value of the template $T_m$ or an absolute difference between a pixel value of the pixel area whose coordinates are (i,j) and that is in the picture block m and an average pixel value or a weighted average pixel value of the template $T_m$.

For example, d(i,j) may represent a distance between the pixel area whose coordinates are (i,j) and that is in the picture block m and an upper left pixel in the template $T_m$, or d(i,j) may represent a distance between the pixel area whose coordinates are (i,j) and that is in the picture block m and a pixel y in the template $T_m$; and the distance between the pixel area whose coordinates are (i,j) and that is in the picture block m and the pixel y in the template $T_m$ is less than or equal to a distance between the pixel area whose coordinates are (i,j) and that is in the picture block m and any pixel in the template $T_m$ except the pixel y.

Optionally, in some possible implementation manners of the present application, the calculating a predicted pixel value of a pixel area in the current picture block based on the weight and a pixel value of the pixel area in the picture block corresponding to each template in the N templates includes: calculating the predicted pixel value of the pixel area in the current picture block by using the following formula and based on the weight and the pixel value of the pixel area in the picture block corresponding to each template in the N templates:

$$pre(i, j) = \frac{\sum_{m=1}^{N} (w_m(i, j) p_m(i, j))}{\sum_{m=1}^{N} w_m(i, j)},$$

where $w_m(i,j)$ represents the weight of the pixel area whose coordinates are (i,j) and that is in the picture block m corresponding to the template $T_m$ in the N templates, $p_m(i,j)$ represents the pixel value of the pixel area whose coordinates are (i,j) and that is in the picture block m, and pre(i,j) represents a predicted pixel value of a pixel area whose coordinates are (i,j) and that is in the current picture block.

It can be understood that, for a pixel area whose coordinates are (i,j), when the pixel area includes multiple pixels, i and j in (i,j) fall within specific value ranges instead of being fixed values.

The picture prediction method provided in this embodiment may be applied in a video coding process, or may be applied in a video decoding process.

It can be learned that, in the picture prediction solution in this embodiment, after M templates with a highest degree of matching with a current template are determined, N templates whose degrees of matching with the current template meet a preset condition are further determined from the M templates, a weight of a pixel area in a picture block corresponding to each template in the N templates is determined, and a predicted pixel value of a pixel area in the current picture block is calculated based on the weight and a pixel value of the pixel area in the picture block corresponding to each template in the N templates. The pixel area includes at least one pixel. Weights of at least two pixel areas in a picture block corresponding to at least one template in the determined N templates are different, that is, weights of at least two pixel areas in a picture block corresponding to a same template are different. Therefore, a conventional-art solution in which weights of all pixel areas in picture blocks corresponding to all templates are the same (where the weights are all equal to 1) is abandoned. Because there is a specific difference between weights of pixel areas, this is more likely to conform to an actual correlation difference. In this way, a pixel value of a pixel area in a current picture block is accurately predicted, and video coding and decoding efficiency are improved.

Figure 3:
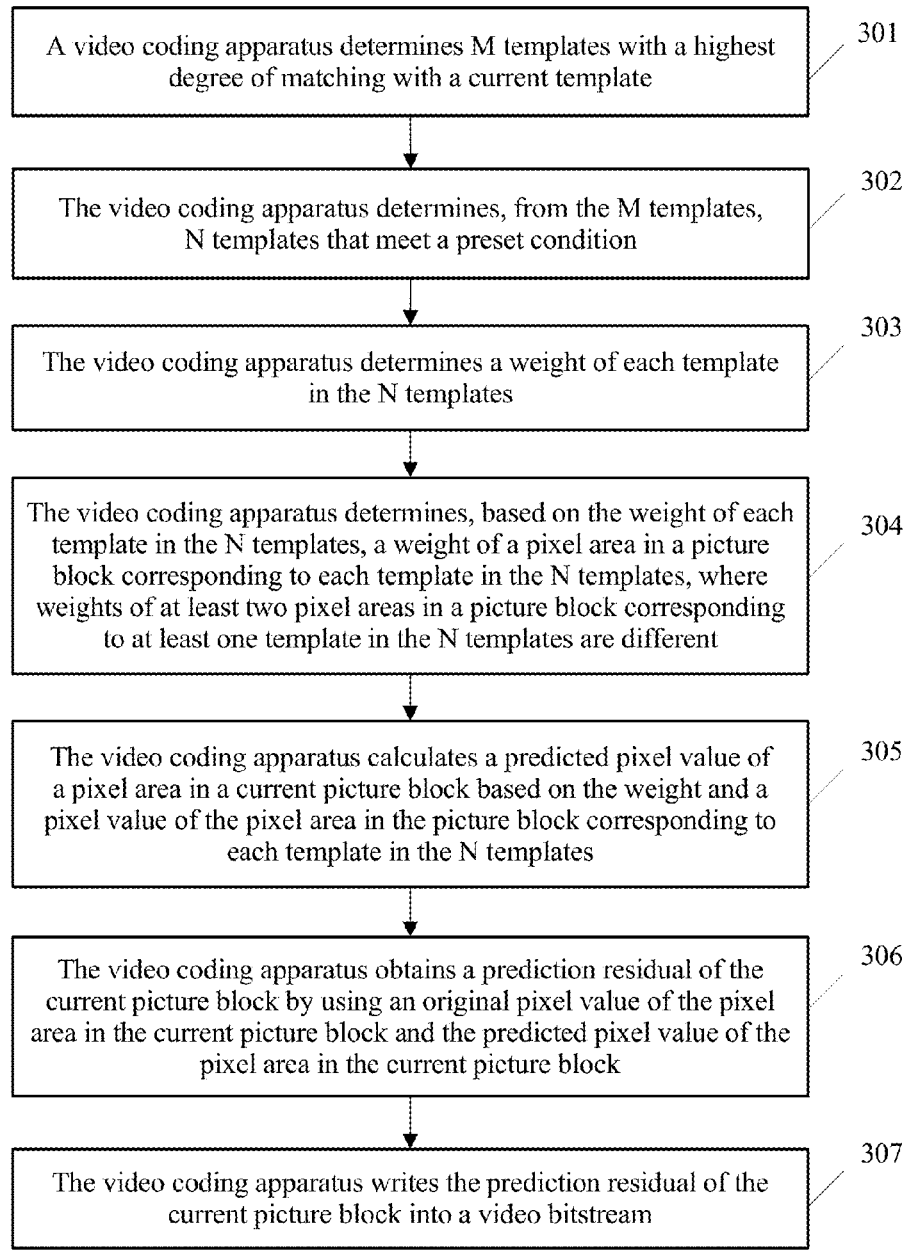
FIG. 3 is a schematic flowchart of another picture prediction method according to an embodiment of the present application.

Referring to FIG. 3, FIG. 3 is a schematic flowchart of another picture prediction method according to another embodiment of the present application. As shown in FIG. 3, the another video coding method provided in the another embodiment of the present application may include the following steps.

301. A video coding apparatus determines M templates with a highest degree of matching with a current template.

M may be a specified value, that is, the M templates with the highest degree of matching with the current template may be selected from several candidate templates. For example, five templates with a highest degree of matching with the current template may be determined from ten candidate templates. Certainly, degrees of matching between the five templates and the current template are not necessarily equal, but a degree of matching between any template in the five templates and the current template is greater than or equal to a degree of matching between any candidate template except the five templates and the current template.

The current template is a template corresponding to a current picture block. The M templates are obtained by searching reference pictures of the current picture block. M is a positive integer.

For example, M may be equal to 2, 3, 4, 5, 7, 9, 12, or another value.

302. The video coding apparatus determines, from the M templates, N templates that meet a preset condition.

For example, that the N templates that meet the preset condition are determined from the M templates includes: determining N templates from the M templates, where distortion between pixel values of the N templates and a pixel value of the current template is less than or equal to a threshold. For example, the threshold is equal to average distortion between the pixel value of the current template and pixel values of the M templates, or the threshold is equal to an adjustment value of average distortion between the pixel value of the current template and pixel values of the M templates. Certainly, the threshold may be another preset value. It can be understood that a screening threshold is introduced to help obtain, by means of screening, a template that is with a relatively low matching degree and that is not involved in an operation, so that prediction accuracy is improved, and operation complexity is reduced.

303. The video coding apparatus determines a weight of each template in the N templates.

For example, the weight of each template in the N templates may be determined according to a degree of matching between each template in the N templates and the current template.

304. The video coding apparatus determines, based on the weight of each template in the N templates, a weight of a pixel area in a picture block corresponding to each template in the N templates.

For example, the weight of the pixel area in the picture block corresponding to each template in the N templates may be determined based on the weight of each template in the N templates and a parameter about a similarity between each template in the N templates and the pixel area in the corresponding picture block.

Weights of at least two pixel areas in a picture block corresponding to at least one template in the N templates are different.

The pixel area mentioned in each embodiment of the present application includes at least one pixel. That is, the pixel area may be a pixel or a pixel block, and if the pixel area is a pixel block, the pixel area may have, for example, a 2×2, 1×2, 1×3, 4×2, 4×3, or 4×4 size, or another size.

The templates in the N templates correspond to different picture blocks, and therefore, the N templates correspond to N picture blocks. A template may be L-shaped or in another shape. For example, as shown in FIG. 1-d, a template corresponding to a picture block may be an L-shaped pixel area adjacent to the picture block. For example, in FIG. 1-d, an L-shaped pixel area $T_x$ adjacent to a picture block x is a template $T_x$ corresponding to the picture block x, an L-shaped pixel area $T_{m1}$ adjacent to a picture block m1 is a template $T_{m1}$ corresponding to the picture bock m1, and an L-shaped pixel area $T_{m2}$ adjacent to a picture block m2 is a template $T_{m2}$ corresponding to the picture block m2. There may be no overlap area between a picture block and a template corresponding to the picture block.

For example, the weight of the pixel area in the picture block corresponding to each template in the N templates may be related to the parameter about the similarity between each template in the N templates and the pixel area in the corresponding picture block. A parameter about a similarity between two objects may be used to represent the similarity between the two objects. For example, a parameter about a similarity between a template $T_m$ in the N templates and a pixel area w in a picture block m may be used to represent the similarity between the template $T_m$ and the pixel area w in the picture block m. The picture block m is a picture block corresponding to the template $T_m$. The template $T_m$ may be any template in the N templates. The pixel area w is any pixel area in the picture block m.

In a specific example, the parameter about the similarity between the template $T_m$ and the pixel area w in the picture block m may be, for example, a distance between the pixel area w and a determined pixel area in the template $T_m$, or may be a ratio of an average or a weighted average of pixel values of a determined pixel area in the template $T_m$ to a pixel value of the pixel area w or an absolute difference between an average or a weighted average of pixel values of a determined pixel area in the template $T_m$ and a pixel value of the pixel area w. That is, there may be a correspondence between a weight of the pixel area w in the picture block m corresponding to the template $T_m$ and the distance between the pixel area w and the determined pixel area in the template $T_m$. Alternatively, there may be a correspondence between a weight of the pixel area w in the picture block m corresponding to the template $T_m$ in the N templates and the ratio of the average or the weighted average of the pixel values of the determined pixel area in the template $T_m$ to the pixel value of the pixel area w or the absolute difference between the average or the weighted average of the pixel values of the determined pixel area in the template $T_m$ and the pixel value of the pixel area w.

Optionally, in some possible implementation manners of the present application, the determined pixel area in the foregoing template $T_m$ may be, for example, an upper left pixel, an upper left pixel area, a lower left pixel, a lower left pixel area, an upper right pixel, an upper right pixel area, a lower right pixel, a lower right pixel area, a center pixel area, a center pixel, or another pixel area in the template $T_m$.

The upper left pixel area in the template $T_m$ is the upper left pixel in the template $T_m$ or a pixel block that is in the template $T_m$ and that includes the upper left pixel in the template $T_m$; the lower left pixel area in the template $T_m$ is the lower left pixel in the template $T_m$ or a pixel block that is in the template $T_m$ and that includes the lower left pixel in the template $T_m$; the upper right pixel area in the template $T_m$ is the upper right pixel in the template $T_m$ or a pixel block that is in the template $T_m$ and that includes the upper right pixel in the template $T_m$; the center pixel area in the template $T_m$ m is the center pixel in the template $T_m$ or a pixel block that is in the template $T_m$ and that includes the center pixel in the template $T_m$.

The distance between the pixel area w and the determined pixel area in the template $T_m$ may be, for example, a distance between a pixel in the pixel area w and a pixel in the determined pixel area in the template $T_m$, where the two pixels are closest to each other, or the distance between the pixel area w and the determined pixel area in the template $T_m$ may be a distance between any pixel in the pixel area w and any pixel in the determined pixel area in the template $T_m$ or the distance between the pixel area w and the determined pixel area in the template $T_m$ may be a distance between a determined pixel in the pixel area w (where the determined pixel in the pixel area w may be an upper left pixel, a lower left pixel, an upper right pixel, a lower right pixel, or a center pixel in the pixel area w) and a determined pixel in the determined pixel area in the template $T_m$ (where the determined pixel in the template $T_m$ is, for example, the upper left pixel, the lower left pixel, the upper right pixel, the lower right pixel, or the center pixel in the template $T_m$). Certainly, the distance between the pixel area w and the determined pixel area in the template $T_m$ may be calculated in another manner.

305. The video coding apparatus calculates a predicted pixel value of a pixel area in the current picture block based on the weight and a pixel value of the pixel area in the picture block corresponding to each template in the N templates.

Optionally, in some possible implementation manners of the present application, the parameter about the similarity between each template in the N templates and the pixel area in the corresponding picture block may include: a distance between a determined pixel area in each template in the N templates and the pixel area in the corresponding picture block; and/or a ratio of an average or a weighted average of pixel values of a determined pixel area in each template in the N templates to the pixel value of the pixel area in the corresponding picture block or an absolute difference between an average or a weighted average of pixel values of a determined pixel area in each template in the N templates and the pixel value of the pixel area in the corresponding picture block.

Optionally, in some possible implementation manners of the present application, that the weight of each template in the N templates is determined according to the degree of matching between each template in the N templates and the current template may include: determining the weight of each template in the N templates based on the following formula and according to the degree of matching between each template in the N templates and the current template:

$$w_m = a^{-(E_{(T_x,T_m)}/S) \times \sigma},$$

where $E_{(T_x,T_m)}$ represents distortion between the current template $T_x$ and a template $T_m$ in the N templates, S represents a quantity of pixel areas in the current template $T_x$, σ represents a template scaling factor, a and σ are real numbers greater than 0, $w_m$ represents a weight of the template $T_m$, and the template $T_m$ is any template in the N templates. When a value of a is, for example, an integer such as 2, 3, or 4, operation complexity is simplified.

Optionally, in some possible implementation manners of the present application, that the weight of the pixel area in the picture block corresponding to each template in the N templates is determined based on the weight of each template in the N templates and the parameter about the similarity between each template in the N templates and the pixel area in the corresponding picture block may include: determining, based on the following formula and based on the weight of each template in the N templates and the parameter about the similarity between each template in the N templates and the pixel area in the corresponding picture block, the weight of the pixel area in the picture block corresponding to each template in the N templates:

$$W_m(i,j) = W_m^{-1/\partial(R(i,j))},$$

where $W_m(i,j)$ represents a weight of a pixel area whose coordinates are (i,j) and that is in a picture block m corresponding to the template $T_m$ in the N templates, R(i,j) represents a parameter about a similarity between the pixel area whose coordinates are (i,j) and that is in the picture block m and the template $T_m$, and $\partial(R(i,j))$ represents a pixel area scaling factor corresponding to R(i,j).

Optionally, in some possible implementation manners of the present application, there is a linear relationship or a non-linear relationship between $\partial(R(i,j))$ and R(i,j).

For example, the linear relationship between $\partial(R(i,j))$ and R(i,j) is:

$$\partial(R(i,j)) = \beta * R(i,j),$$

where β is a scaling coefficient, and β is a real number greater than 0.

For example, the non-linear relationship between $\partial(R(i,j))$ and R(i,j) is: a value of $\partial(R(i,j))$ is determined based on a distance interval within which R(i,j) falls, and different distance intervals correspond to pixel area scaling factors with different values.

For example, the non-linear relationship between $\partial(R(i,j))$ and R(i,j) may be:

$$\partial(d(i,j)) = \begin{cases} a1, & d(i,j) \le b1 \\ a2, & b1 < d(i,j) \le b2, \\ a3, & d(i,j) > b2 \end{cases}$$

where a1 is less than a2, a2 is less than a3, and b1 is less than b2; and a1, a2, a3, b1, and b2 are real numbers greater than 0.

For another example, the non-linear relationship between $\partial(R(i,j))$ and R(i,j) may be:

$$\partial(d(i,j)) = \begin{cases} a4, & d(i,j) \le b3 \\ a5, & b3 < d(i,j) \le b4 \\ a6, & b4 < d(i,j) \le b5 \\ a7, & d(i,j) > b5 \end{cases},$$

where a4 is less than a5, a5 is less than a6, a6 is less than a7, b3 is less than b4, and b4 is less than b5; and a4, a5, a6, a7, b3, b4, and b5 are real numbers greater than 0.

For another example, the non-linear relationship between $\partial(R(i,j))$ and R(i,j) may be:

$$\partial(d(i,j)) = \begin{cases} a8, & d(i,j) \le b6 \\ a9, & d(i,j) > b6 \end{cases},$$

where a8 is less than a9, and a8, a9, and b6 are real numbers greater than 0.

The foregoing examples show that the non-linear relationship between $\partial(R(i,j))$ and R(i,j) may be a piecewise function relationship. A piecewise quantity of a piecewise function may not be limited to 2, 3, or 4 shown in the foregoing examples, and certainly, may be larger.

Optionally, in some possible implementation manners of the present application, R(i,j) may be, for example, equal to d(i,j) or e(i,j) d(i,j) represents a distance between the pixel area whose coordinates are (i,j) and that is in the picture block m and a determined pixel area in the template $T_m$, and e(i,j) represents a ratio of a pixel value of the pixel area whose coordinates are (i,j) and that is in the picture block m to an average pixel value or a weighted average pixel value of the template $T_m$ or an absolute difference between a pixel value of the pixel area whose coordinates are (i,j) and that is in the picture block m and an average pixel value or a weighted average pixel value of the template $T_m$.

For example, d(i,j) may represent a distance between the pixel area whose coordinates are (i,j) and that is in the picture block m and an upper left pixel in the template $T_m$, or d(i,j) may represent a distance between the pixel area whose coordinates are (i,j) and that is in the picture block m and a pixel y in the template $T_m$; and the distance between the pixel area whose coordinates are (i,j) and that is in the picture block m and the pixel y in the template $T_m$ is less than or equal to a distance between the pixel area whose coordinates are (i,j) and that is in the picture block m and any pixel in the template $T_m$ except the pixel y.

Optionally, in some possible implementation manners of the present application, that the predicted pixel value of the pixel area in the current picture block is calculated based on the weight and the pixel value of the pixel area in the picture block corresponding to each template in the N templates includes: calculating the predicted pixel value of the pixel area in the current picture block by using the following formula and based on the weight and the pixel value of the pixel area in the picture block corresponding to each template in the N templates:

$$pre(i, j) = \frac{\sum_{m=1}^{N} (w_m(i, j) p_m(i, j))}{\sum_{m=1}^{N} w_m(i, j)},$$

where $w_m$(i,j) represents the weight of the pixel area whose coordinates are (i,j) and that is in the picture block m corresponding to the template $T_m$ in the N templates, $p_m$(i,j) represents the pixel value of the pixel area whose coordinates are (i,j) and that is in the picture block m, and pre(i,j) represents a predicted pixel value of a pixel area whose coordinates are (i,j) and that is in the current picture block.

It can be understood that, for a pixel area whose coordinates are (i,j), when the pixel area includes multiple pixels, i and j in (i,j) fall within specific value ranges instead of being fixed values.

306. The video coding apparatus obtains a prediction residual of the current picture block by using an original pixel value of the pixel area in the current picture block and the predicted pixel value of the pixel area in the current picture block.

307. The video coding apparatus writes the prediction residual of the current picture block into a video bitstream.

The picture prediction method provided in this embodiment may be applied in a video coding process, or may be applied in a video decoding process.

It can be learned that, in the picture coding solution in this embodiment, after M templates with a highest degree of matching with a current template are determined, N templates whose degrees of matching with the current template meet a preset condition are further determined from the M templates, a weight of a pixel area in a picture block corresponding to each template in the N templates is determined, and a predicted pixel value of a pixel area in the current picture block is calculated based on the weight and a pixel value of the pixel area in the picture block corresponding to each template in the N templates. The pixel area includes at least one pixel. Weights of at least two pixel areas in a picture block corresponding to at least one template in the determined N templates are different, that is, weights of at least two pixel areas in a picture block corresponding to a same template are different. Therefore, a conventional-art solution in which weights of all pixel areas in picture blocks corresponding to all templates are the same (where the weights are all equal to 1) is abandoned. Because there is a specific difference between weights of pixel areas, this is more likely to conform to an actual correlation difference. In this way, a pixel value of a pixel area in a current picture block is accurately predicted, and video coding and decoding efficiency are improved.

Figure 4:
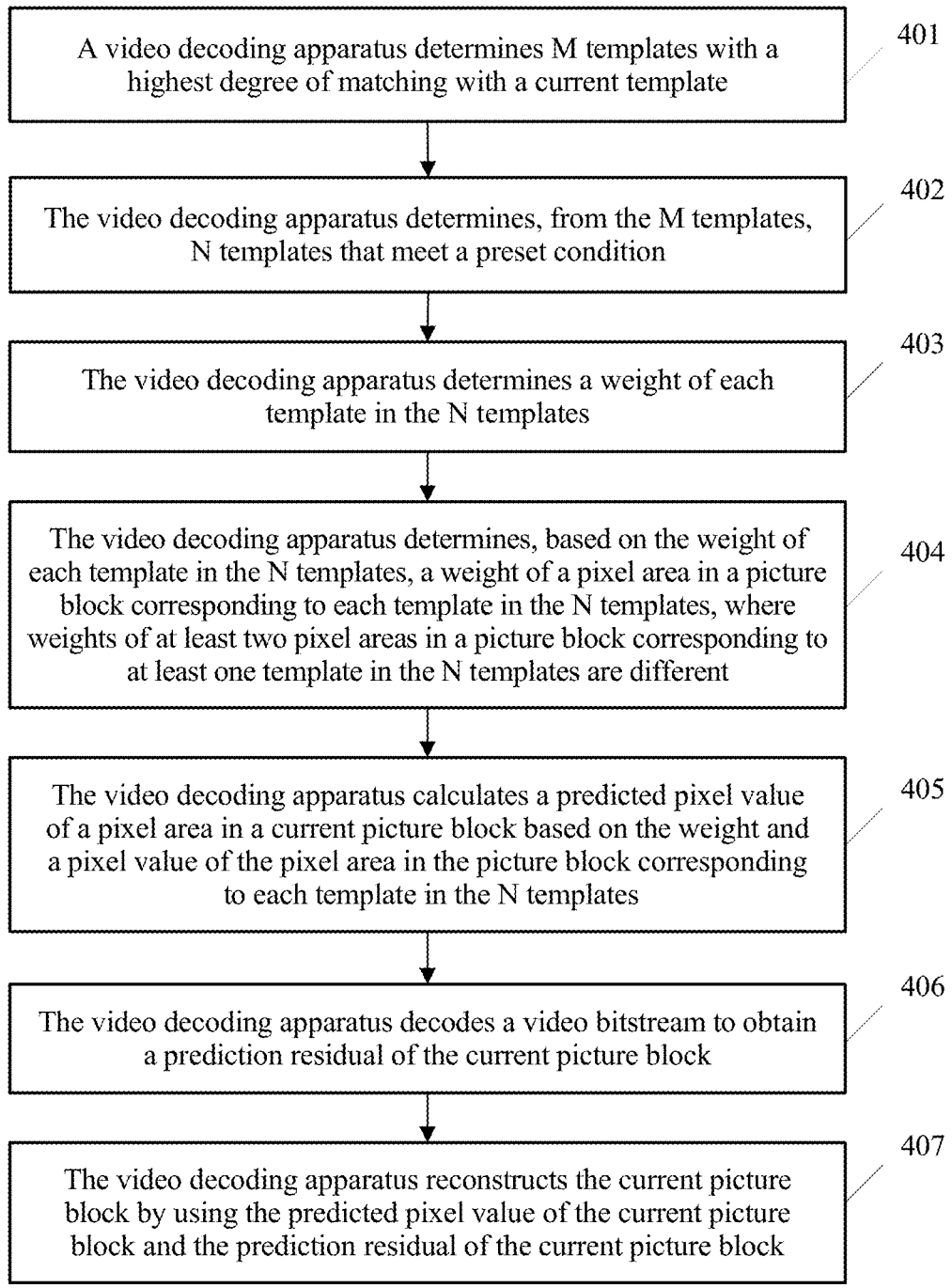
FIG. 4 is a schematic flowchart of another picture prediction method according to an embodiment of the present application.

Referring to FIG. 4, FIG. 4 is a schematic flowchart of another picture prediction method according to another embodiment of the present application. As shown in FIG. 4, the another video decoding method provided in the another embodiment of the present application may include the following steps.

401. A video decoding apparatus determines M templates with a highest degree of matching with a current template.

M may be a specified value, that is, the M templates with the highest degree of matching with the current template may be selected from several candidate templates. For example, five templates with a highest degree of matching with the current template may be determined from ten candidate templates. Certainly, degrees of matching between the five templates and the current template are not necessarily equal, but a degree of matching between any template in the five templates and the current template is greater than or equal to a degree of matching between any candidate template except the five templates and the current template.

The current template is a template corresponding to a current picture block. The M templates are obtained by searching reference pictures of the current picture block. M is a positive integer.

For example, M may be equal to 2, 3, 4, 5, 7, 9, 12, or another value.

402. The video decoding apparatus determines, from the M templates, N templates that meet a preset condition.

For example, that the N templates that meet the preset condition are determined from the M templates includes: determining N templates from the M templates, where distortion between pixel values of the N templates and a pixel value of the current template is less than or equal to a threshold. For example, the threshold is equal to average distortion between the pixel value of the current template and pixel values of the M templates, or the threshold is equal to an adjustment value of average distortion between the pixel value of the current template and pixel values of the M templates. Certainly, the threshold may be another preset value. It can be understood that a screening threshold is introduced to help obtain, by means of screening, a template that is with a relatively low matching degree and that is not involved in an operation, so that prediction accuracy is improved, and operation complexity is reduced.

403. The video decoding apparatus determines a weight of each template in the N templates.

For example, the weight of each template in the N templates may be determined according to a degree of matching between each template in the N templates and the current template.

404. The video decoding apparatus determines, based on the weight of each template in the N templates, a weight of a pixel area in a picture block corresponding to each template in the N templates.

For example, the weight of the pixel area in the picture block corresponding to each template in the N templates may be determined based on the weight of each template in the N templates and a parameter about a similarity between each template in the N templates and the pixel area in the corresponding picture block.

Weights of at least two pixel areas in a picture block corresponding to at least one template in the N templates are different.

The pixel area mentioned in each embodiment of the present application includes at least one pixel. That is, the pixel area may be a pixel or a pixel block, and if the pixel area is a pixel block, the pixel area may have, for example, a 2×2, 1×2, 1×3, 4×2, 4×3, or 4×4 size, or another size.

The templates in the N templates correspond to different picture blocks, and therefore, the N templates correspond to N picture blocks. A template may be L-shaped or in another shape. For example, as shown in FIG. 1-d, a template corresponding to a picture block may be an L-shaped pixel area adjacent to the picture block. For example, in FIG. 1-d, an L-shaped pixel area $T_x$ adjacent to a picture block x is a template $T_x$ corresponding to the picture block x, an L-shaped pixel area $T_{m1}$ adjacent to a picture block m1 is a template $T_{m1}$ corresponding to the picture block m1, and an L-shaped pixel area $T_{m2}$ adjacent to a picture block m2 is a template $T_{m2}$ corresponding to the picture block m2. There may be no overlap area between a picture block and a template corresponding to the picture block.

For example, the weight of the pixel area in the picture block corresponding to each template in the N templates may be related to the parameter about the similarity between each template in the N templates and the pixel area in the corresponding picture block. A parameter about a similarity between two objects may be used to represent the similarity between the two objects. For example, a parameter about a similarity between a template $T_m$ in the N templates and a pixel area w in a picture block m may be used to represent the similarity between the template $T_m$; and the pixel area w in the picture block m. The picture block m is a picture block corresponding to the template $T_m$. The template $T_m$ may be any template in the N templates. The pixel area w is any pixel area in the picture block m.

In a specific example, the parameter about the similarity between the template $T_m$ and the pixel area w in the picture block m may be, for example, a distance between the pixel area w and a determined pixel area in the template $T_m$ or may be a ratio of an average or a weighted average of pixel values of a determined pixel area in the template $T_m$ to a pixel value of the pixel area w or an absolute difference between an average or a weighted average of pixel values of a determined pixel area in the template $T_m$ and a pixel value of the pixel area w. That is, there may be a correspondence between a weight of the pixel area w in the picture block m corresponding to the template $T_m$ and the distance between the pixel area w and the determined pixel area in the template $T_m$ Alternatively, there may be a correspondence between a weight of the pixel area w in the picture block m corresponding to the template $T_m$ in the N templates and the ratio of the average or the weighted average of the pixel values of the determined pixel area in the template $T_m$ to the pixel value of the pixel area w or the absolute difference between the average or the weighted average of the pixel values of the determined pixel area in the template $T_m$ and the pixel value of the pixel area w.

Optionally, in some possible implementation manners of the present application, the determined pixel area in the foregoing template $T_m$ may be, for example, an upper left pixel, an upper left pixel area, a lower left pixel, a lower left pixel area, an upper right pixel, an upper right pixel area, a lower right pixel, a lower right pixel area, a center pixel area, a center pixel, or another pixel area in the template $T_m$.

The upper left pixel area in the template $T_m$ is the upper left pixel in the template $T_m$ or a pixel block that is in the template $T_m$ and that includes the upper left pixel in the template $T_m$; the lower left pixel area in the template $T_m$ is the lower left pixel in the template $T_m$ or a pixel block that is in the template $T_m$ and that includes the lower left pixel in the template $T_m$; the upper right pixel area in the template $T_m$ is the upper right pixel in the template $T_m$ or a pixel block that is in the template $T_m$ and that includes the upper right pixel in the template $T_m$; the center pixel area in the template $T_m$ is the center pixel in the template $T_m$ or a pixel block that is in the template $T_m$ and that includes the center pixel in the template $T_m$.

The distance between the pixel area w and the determined pixel area in the template $T_m$ may be, for example, a distance between a pixel in the pixel area w and a pixel in the determined pixel area in the template $T_m$, where the two pixels are closest to each other, or the distance between the pixel area w and the determined pixel area in the template $T_m$ may be a distance between any pixel in the pixel area w and any pixel in the determined pixel area in the template $T_m$ or the distance between the pixel area w and the determined pixel area in the template $T_m$ may be a distance between a determined pixel in the pixel area w (where the determined pixel in the pixel area w may be an upper left pixel, a lower left pixel, an upper right pixel, a lower right pixel, or a center pixel in the pixel area w) and a determined pixel in the determined pixel area in the template $T_m$ (where the determined pixel in the template $T_m$ is, for example, the upper left pixel, the lower left pixel, the upper right pixel, the lower right pixel, or the center pixel in the template $T_m$). Certainly, the distance between the pixel area w and the determined pixel area in the template $T_m$ may be calculated in another manner.

405. The video decoding apparatus calculates a predicted pixel value of a pixel area in the current picture block based on the weight and a pixel value of the pixel area in the picture block corresponding to each template in the N templates.

Optionally, in some possible implementation manners of the present application, the parameter about the similarity between each template in the N templates and the pixel area in the corresponding picture block may include: a distance between a determined pixel area in each template in the N templates and the pixel area in the corresponding picture block; and/or a ratio of an average or a weighted average of pixel values of a determined pixel area in each template in the N templates to the pixel value of the pixel area in the corresponding picture block or an absolute difference between an average or a weighted average of pixel values of a determined pixel area in each template in the N templates and the pixel value of the pixel area in the corresponding picture block.

Optionally, in some possible implementation manners of the present application, that the weight of each template in the N templates is determined according to the degree of matching between each template in the N templates and the current template may include: determining the weight of each template in the N templates based on the following formula and according to the degree of matching between each template in the N templates and the current template:

$$w_m = a^{-(E(T_x, T_m)/S) \times \sigma},$$

where $E_{(T_x,T_m)}$ represents distortion between the current template $T_x$ and a template $T_m$ in the N templates, S represents a quantity of pixel areas in the current template $T_x$, σ represents a template scaling factor, a and σ are real numbers greater than 0, $w_m$ represents a weight of the template $T_m$, and the template $T_m$ is any template in the N templates. When a value of a is, for example, an integer such as 2, 3, or 4, operation complexity is simplified.

Optionally, in some possible implementation manners of the present application, that the weight of the pixel area in the picture block corresponding to each template in the N templates is determined based on the weight of each template in the N templates and the parameter about the similarity between each template in the N templates and the pixel area in the corresponding picture block may include: determining, based on the following formula and based on the weight of each template in the N templates and the parameter about the similarity between each template in the N templates and the pixel area in the corresponding picture block, the weight of the pixel area in the picture block corresponding to each template in the N templates:

$$w_m(i,j) = w_m^{-1/\partial(R(i,j))},$$

where $w_m(i,j)$ represents a weight of a pixel area whose coordinates are (i,j) and that is in a picture block m corresponding to the template $T_m$ in the N templates, R(i,j) represents a parameter about a similarity between the pixel area whose coordinates are (i,j) and that is in the picture block m and the template $T_m$, and $\partial(R(i,j))$ represents a pixel area scaling factor corresponding to R(i,j).

Optionally, in some possible implementation manners of the present application, there is a linear relationship or a non-linear relationship between $\partial(R(i,j))$ and R(i,j).

For example, the linear relationship between $\partial(R(i,j))$ and R(i,j) is:

$$\partial(R(i,j)) = \beta * R(i,j),$$

where β is a scaling coefficient, and β is a real number greater than 0.

For example, the non-linear relationship between $\partial(R(i,j))$ and R(i,j) is: a value of $\partial(R(i,j))$ is determined based on a distance interval within which R(i,j) falls, and different distance intervals correspond to pixel area scaling factors with different values.

For example, the non-linear relationship between $\partial(R(i,j))$ and R(i,j) may be:

$$\partial(d(i,j)) = \begin{cases} a1, & d(i,j) \le b1 \\ a2, & b1 < d(i,j) \le b2 \\ a3, & d(i,j) > b2 \end{cases},$$

where a1 is less than a2, a2 is less than a3, and b1 is less than b2; and a1, a2, a3, b1, and b2 are real numbers greater than 0.

For another example, the non-linear relationship between $\partial(R(i,j))$ and R(i,j) may be:

$$\partial(d(i,j)) = \begin{cases} a4, & d(i,j) \le b3 \\ a5, & b3 < d(i,j) \le b4 \\ a6, & b4 < d(i,j) \le b5 \\ a7, & d(i,j) > b5 \end{cases},$$

where a4 is less than a5, a5 is less than a6, a6 is less than a7, b3 is less than b4, and b4 is less than b5; and a4, a5, a6, a7, b3, b4, and b5 are real numbers greater than 0.

For another example, the non-linear relationship between $\partial(R(i,j))$ and R(i,j) may be:

$$\partial(d(i,j)) = \begin{cases} a8, & d(i,j) \le b6 \\ a9, & d(i,j) > b6 \end{cases},$$

where a8 is less than a9, and a8, a9, and b6 are real numbers greater than 0.

The foregoing examples show that the non-linear relationship between $\partial(R(i,j))$ and R(i,j) may be a piecewise function relationship. A piecewise quantity of a piecewise function may not be limited to 2, 3, or 4 shown in the foregoing examples, and certainly, may be larger.

Optionally, in some possible implementation manners of the present application, R(i,j) may be, for example, equal to d(i,j) or e(i,j) d(i,j) represents a distance between the pixel area whose coordinates are (i,j) and that is in the picture block m and a determined pixel area in the template $T_m$, and e(i,j) represents a ratio of a pixel value of the pixel area whose coordinates are (i,j) and that is in the picture block m to an average pixel value or a weighted average pixel value of the template $T_m$ or an absolute difference between a pixel value of the pixel area whose coordinates are (i,j) and that is in the picture block m and an average pixel value or a weighted average pixel value of the template $T_m$.

For example, d(i,j) may represent a distance between the pixel area whose coordinates are (i,j) and that is in the picture block m and an upper left pixel in the template $T_m$, or d(i,j) may represent a distance between the pixel area whose coordinates are (i,j) and that is in the picture block m and a pixel y in the template $T_m$; and the distance between the pixel area whose coordinates are (i,j) and that is in the picture block m and the pixel y in the template $T_m$ is less than or equal to a distance between the pixel area whose coordinates are (i,j) and that is in the picture block m and any pixel in the template $T_m$ except the pixel y.

Optionally, in some possible implementation manners of the present application, that the predicted pixel value of the pixel area in the current picture block is calculated based on the weight and the pixel value of the pixel area in the picture block corresponding to each template in the N templates includes: calculating the predicted pixel value of the pixel area in the current picture block by using the following formula and based on the weight and the pixel value of the pixel area in the picture block corresponding to each template in the N templates:

$$pre(i,j) = \frac{\sum_{m=1}^{N}(w_m(i,j)p_m(i,j))}{\sum_{m=1}^{N} w_m(i,j)},$$

where $w_m(i,j)$ represents the weight of the pixel area whose coordinates are (i,j) and that is in the picture block m corresponding to the template $T_m$ in the N templates, $p_m(i,j)$ represents the pixel value of the pixel area whose coordinates are (i,j) and that is in the picture block m, and pre(i,j)

represents a predicted pixel value of a pixel area whose coordinates are (i,j) and that is in the current picture block.

It can be understood that, for a pixel area whose coordinates are (i,j), when the pixel area includes multiple pixels, i and j in (i,j) fall within specific value ranges instead of being fixed values.

406. The video decoding apparatus decodes a video bitstream to obtain a prediction residual of the current picture block.

407. The video decoding apparatus reconstructs the current picture block by using the predicted pixel value of the current picture block and the prediction residual of the current picture block.

It can be learned that, in the picture decoding solution in this embodiment, after M templates with a highest degree of matching with a current template are determined, N templates whose degrees of matching with the current template meet a preset condition are further determined from the M templates, a weight of a pixel area in a picture block corresponding to each template in the N templates is determined, and a predicted pixel value of a pixel area in the current picture block is calculated based on the weight and a pixel value of the pixel area in the picture block corresponding to each template in the N templates. The pixel area includes at least one pixel. Weights of at least two pixel areas in a picture block corresponding to at least one template in the determined N templates are different, that is, weights of at least two pixel areas in a picture block corresponding to a same template are different. Therefore, a conventional-art solution in which weights of all pixel areas in picture blocks corresponding to all templates are the same (where the weights are all equal to 1) is abandoned. Because there is a specific difference between weights of pixel areas, this is more likely to conform to an actual correlation difference. In this way, a pixel value of a pixel area in a current picture block is accurately predicted, and video coding and decoding efficiency are improved.

Performance is improved by implementing the foregoing solutions under some test conditions.

Under a condition 1, that is, in an application scenario in which N templates that meet a condition are directly determined from candidate templates, and there is a linear relationship between $\partial(R(i,j))$ and $R(i,j)$ (for example, $\partial(R(i,j))=\beta*R(i,j)$), coding efficiency for each color component is improved as follows: Y—8.3%, U—7.8%, and V—7.5%.

Under a condition 2, that is, in an application scenario in which N templates that meet a condition are directly determined from candidate templates, and there is a piecewise function relationship between $\partial(R(i,j))$ and $R(i,j)$, coding efficiency for each color component is improved as follows: Y—8.1%, U—7.4%, and V—7.5%.

Under a condition 3, that is, in an application scenario in which M templates are first determined from candidate templates, N templates that meet a condition are then determined from the M templates, and there is a linear relationship between $\partial(R(i,j))$ and $R(i,j)$ (for example, $\partial(R(i,j))=\beta*R(i,j)$), coding efficiency for each color component is improved as follows: Y—8.5%, U—8.0%, and V—7.7%.

Rate-distortion performance improvement effects obtained by means of testing based on a ClassF sequence are shown in the following table.

| | Condition 1 | Condition 2 | Condition 3 |
|---|---|---|---|
| BasketballDrillText | −2.9% | −3.3% | −3.3% |
| ChinaSpeed | −4.0% | −3.6% | −4.2% |
| SlideEditing | −19.2% | −18.5% | −19.4% |
| SlideShow | −7.0% | −6.9% | −7.1% |
| ClassF sequence average | −8.3% | −8.1% | −8.5% |

It can be learned that, under a test condition, coding efficiency and rate-distortion performance can be greatly improved in the solutions in the embodiments of the present application.

Related apparatuses used to implement the foregoing solutions are further provided in the following.

Figure 5:
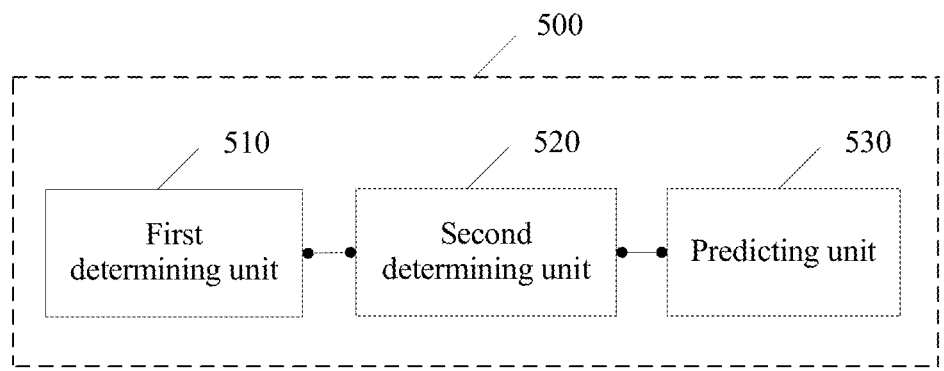
FIG. 5 is a schematic diagram of a picture prediction apparatus according to an embodiment of the present application.

Referring to FIG. 5, an embodiment of the present application further provides a picture prediction apparatus 500, and the apparatus 500 may include:

a first determining unit 510, configured to determine N templates whose degrees of matching with a current template meet a preset condition, where the current template is a template corresponding to a current picture block, the N templates are obtained by searching reference pictures of the current picture block, and N is a positive integer;

a second determining unit 520, configured to determine a weight of a pixel area in a picture block corresponding to each template in the N templates, where weights of at least two pixel areas in a picture block corresponding to at least one template in the N templates are different; and a predicting unit 530, configured to calculate a predicted pixel value of a pixel area in the current picture block based on the weight and a pixel value of the pixel area in the picture block corresponding to each template in the N templates, where the pixel area includes at least one pixel.

Optionally, in some possible implementation manners of the present application, the second determining unit 520 includes:

a first determining subunit, configured to determine a weight of each template in the N templates according to a degree of matching between each template in the N templates and the current template; and a second determining subunit, configured to determine, based on the weight of each template in the N templates and a parameter about a similarity between each template in the N templates and the pixel area in the corresponding picture block, the weight of the pixel area in the picture block corresponding to each template in the N templates.

Optionally, in some possible implementation manners of the present application, the parameter about the similarity between each template in the N templates and the pixel area in the corresponding picture block includes: a distance between a determined pixel area in each template in the N templates and the pixel area in the corresponding picture block; and/or a ratio of an average or a weighted average of pixel values of a determined pixel area in each template in the N templates to the pixel value of the pixel area in the corresponding picture block or an absolute difference between an average or a weighted average of pixel values of a determined pixel area in each template in the N templates and the pixel value of the pixel area in the corresponding picture block.

Optionally, in some possible implementation manners of the present application, the first determining subunit is specifically configured to determine the weight of each template in the N templates based on the following formula and according to the degree of matching between each template in the N templates and the current template:

$$w_m = a^{-(E_{(T_x,T_m)}/S)\times\sigma},$$

where $E_{(T_x,T_m)}$ represents distortion between the current template $T_x$ and a template $T_m$ in the N templates, S represents a quantity of pixel areas in the current template $T_m$, σ represents a template scaling factor, a and σ are real numbers greater than 0, $w_m$ represents a weight of the template $T_m$, and the template $T_m$ is any template in the N templates.

Optionally, in some possible implementation manners of the present application, the second determining subunit is specifically configured to determine, based on the following formula and based on the weight of each template in the N templates and the parameter about the similarity between each template in the N templates and the pixel area in the corresponding picture block, the weight of the pixel area in the picture block corresponding to each template in the N templates:

$$W_m(i,j) = W_m^{-1/\partial(R(i,j))},$$

where $W_m(i,j)$ represents a weight of a pixel area whose coordinates are (i,j) and that is in a picture block m corresponding to the template $T_m$ in the N templates, R(i,j) represents a parameter about a similarity between the pixel area whose coordinates are (i,j) and that is in the picture block m and the template $T_m$, and ∂(R(i,j)) represents a pixel area scaling factor corresponding to R(i,j).

Optionally, in some possible implementation manners of the present application, there is a linear relationship or a non-linear relationship between ∂(R(i,j)) and R(i,j).

Optionally, in some possible implementation manners of the present application, the linear relationship between ∂(R(i,j)) and R(i,j) is: ∂(R(i,j))=β*R(i,j) where β is a scaling coefficient, and β is a real number greater than 0.

Optionally, in some possible implementation manners of the present application, the non-linear relationship between ∂(R(i,j)) and R(i,j) is: a value of ∂(R(i,j)) is determined based on a distance interval within which R(i,j) falls, and different distance intervals correspond to pixel area scaling factors with different values.

Optionally, in some possible implementation manners of the present application, the non-linear relationship between ∂(R(i,j)) and R(i,j) is:

$$\partial(d(i,j)) = \begin{cases} a1, d(i,j) \le b1 \\ a2, b1 < d(i,j) \le b2, \\ a3, d(i,j) > b2 \end{cases}$$

where a1 is less than a2, a2 is less than a3, and b1 is less than b2; and a1, a2, a3, b1, and b2 are real numbers greater than 0; or the non-linear relationship between ∂(R(i,j)) and R(i,j) is:

$$\partial(d(i,j)) = \begin{cases} a4, d(i,j) \le b3 \\ a5, b3 < d(i,j) \le b4 \\ a6, b4 < d(i,j) \le b5 \\ a7, d(i,j) > b5 \end{cases},$$

where a4 is less than a5, a5 is less than a6, a6 is less than a7, b3 is less than b4, and b4 is less than b5; and a4, a5, a6, a7, b3, b4, and b5 are real numbers greater than 0; or the non-linear relationship between ∂(R(i,j)) and R(i,j) is:

$$\partial(d(i,j)) = \begin{cases} a8, d(i,j) \le b6 \\ a9, d(i,j) > b6 \end{cases},$$

where a8 is less than a9, and a8, a9, and b6 are real numbers greater than 0.

Optionally, in some possible implementation manners of the present application, R(i,j) is equal to d(i,j) or e(i,j), d(i,j) represents a distance between the pixel area whose coordinates are (i,j) and that is in the picture block m and a determined pixel area in the template $T_m$, and e(i,j) represents a ratio of a pixel value of the pixel area whose coordinates are (i,j) and that is in the picture block m to an average pixel value or a weighted average pixel value of the template $T_m$ or an absolute difference between a pixel value of the pixel area whose coordinates are (i,j) and that is in the picture block m and an average pixel value or a weighted average pixel value of the template $T_m$.

Optionally, in some possible implementation manners of the present application, d(i,j) represents a distance between the pixel area whose coordinates are (i,j) and that is in the picture block m and an upper left pixel in the template $T_m$, or d(i,j) represents a distance between the pixel area whose coordinates are (i,j) and that is in the picture block m and a pixel y in the template $T_m$; and the distance between the pixel area whose coordinates are (i,j) and that is in the picture block m and the pixel y in the template $T_m$ is less than or equal to a distance between the pixel area whose coordinates are (i,j) and that is in the picture block m and any pixel in the template $T_m$ except the pixel y.

Optionally, in some possible implementation manners of the present application, the predicting unit 530 is specifically configured to calculate the predicted pixel value of the pixel area in the current picture block by using the following formula and based on the weight and the pixel value of the pixel area in the picture block corresponding to each template in the N templates:

$$pre(i,j) = \frac{\sum_{m=1}^{N}(w_m(i,j)p_m(i,j))}{\sum_{m=1}^{N}w_m(i,j)},$$

where $W_m(i,j)$ represents the weight of the pixel area whose coordinates are (i,j) and that is in the picture block m corresponding to the template $T_m$ in the N templates, $p_m(i,j)$ represents the pixel value of the pixel area whose coordinates are (i,j) and that is in the picture block m, and pre(i,j) represents a predicted pixel value of a pixel area whose coordinates are (i,j) and that is in the current picture block.

Optionally, in some possible implementation manners of the present application, the first determining unit 510 is specifically configured to: determine M templates with a highest degree of matching with the current template; and determine, from the M templates, N templates that meet the preset condition, where N is less than M.

Optionally, in some possible implementation manners of the present application, the first determining unit 510 is specifically configured to: determine the M templates with the highest degree of matching with the current template; and determine N templates from the M templates, where distortion between pixel values of the N templates and a pixel value of the current template is less than or equal to a threshold.

Optionally, in some possible implementation manners of the present application, the threshold is equal to average distortion between the pixel value of the current template and pixel values of the M templates, or the threshold is equal to an adjustment value of average distortion between the pixel value of the current template and pixel values of the M templates.

Optionally, in some possible implementation manners of the present application, the picture prediction apparatus is applied to a video coding apparatus, or the picture prediction apparatus is applied to a video decoding apparatus.

It can be understood that functions of function modules of the picture prediction apparatus 500 in this embodiment may be specifically implemented according to the methods in the foregoing method embodiments. For a specific implementation process, refer to related descriptions in the foregoing method embodiments. Details are not described herein again. The picture prediction apparatus 500 may be any apparatus that needs to output or play a video, for example, a device such as a laptop computer, a tablet computer, a personal computer, or a mobile phone.

It can be learned that, after determining N templates whose degrees of matching with a current template meet a preset condition, the picture prediction apparatus 500 in this embodiment determines a weight of a pixel area in a picture block corresponding to each template in the N templates, and calculates a predicted pixel value of a pixel area in the current picture block based on the weight and a pixel value of the pixel area in the picture block corresponding to each template in the N templates. The pixel area includes at least one pixel. Weights of at least two pixel areas in a picture block corresponding to at least one template in the determined N templates are different, that is, weights of at least two pixel areas in a picture block corresponding to a same template are different. Therefore, a conventional-art solution in which weights of all pixel areas in picture blocks corresponding to all templates are the same (where the weights are all equal to 1) is abandoned. Because there is a specific difference between weights of pixel areas, this is more likely to conform to an actual correlation difference. In this way, a pixel value of a pixel area in a current picture block is accurately predicted, and video coding and decoding efficiency are improved.

Figure 6:
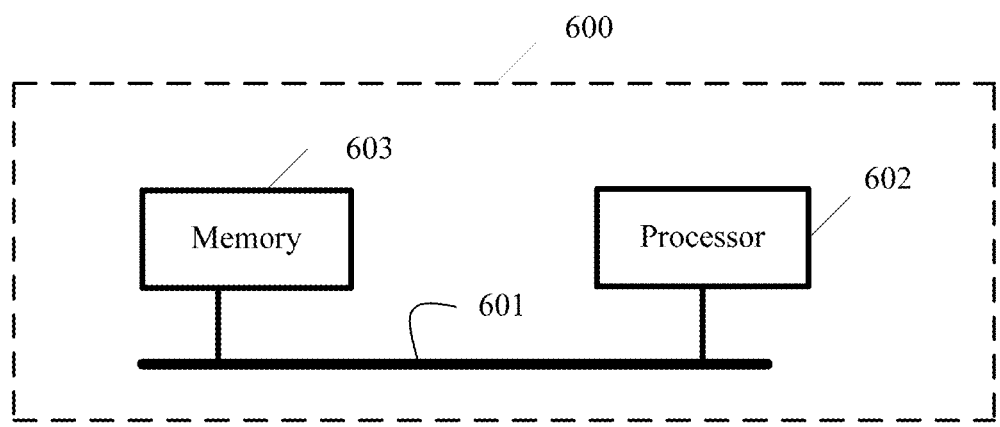
FIG. 6 is a schematic diagram of another picture prediction apparatus according to an embodiment of the present application.

Referring to FIG. 6, FIG. 6 is a schematic diagram of a picture prediction apparatus 600 according to an embodiment of the present application. The picture prediction apparatus 600 may include at least one bus 601, at least one processor 602 connected to the bus 601, and at least one memory 603 connected to the bus 601.

The processor 602 invokes, by using the bus 601, code stored in the memory 603, so as to determine N templates whose degrees of matching with a current template meet a preset condition, where the current template is a template corresponding to a current picture block, N is a positive integer, and the N templates are obtained by searching reference pictures of the current picture block; determine a weight of a pixel area in a picture block corresponding to each template in the N templates, where weights of at least two pixel areas in a picture block corresponding to at least one template in the N templates are different; and calculate a predicted pixel value of a pixel area in the current picture block based on the weight and a pixel value of the pixel area in the picture block corresponding to each template in the N templates, where the pixel area includes at least one pixel.

For example, N may be equal to 1, 2, 3, 4, 5, 7, 9, 12, or another value.

The pixel area mentioned in each embodiment of the present application includes at least one pixel. That is, the pixel area may be a pixel or a pixel block, and if the pixel area is a pixel block, the pixel area may have, for example, a 2×2, 1×2, 1×3, 4×2, 4×3, or 4×4 size, or another size.

The templates in the N templates correspond to different picture blocks, and therefore, the N templates correspond to N picture blocks.

For example, the weight of the pixel area in the picture block corresponding to each template in the N templates may be related to a parameter about a similarity between each template in the N templates and the pixel area in the corresponding picture block. A parameter about a similarity between two objects may be used to represent the similarity between the two objects. For example, a parameter about a similarity between a template $T_m$ in the N templates and a pixel area w in a picture block m may be used to represent the similarity between the template $T_m$ and the pixel area w in the picture block m. The picture block m is a picture block corresponding to the template $T_m$. The template $T_m$ may be any template in the N templates. The pixel area w is any pixel area in the picture block m.

In a specific example, the parameter about the similarity between the template $T_m$ and the pixel area w in the picture block m may be, for example, a distance between the pixel area w and a determined pixel area in the template $T_m$ or may be a ratio of an average or a weighted average of pixel values of a determined pixel area in the template $T_m$ to a pixel value of the pixel area w or an absolute difference between an average or a weighted average of pixel values of a determined pixel area in the template $T_m$ and a pixel value of the pixel area w. That is, there may be a correspondence between a weight of the pixel area w in the picture block m corresponding to the template $T_m$ and the distance between the pixel area w and the determined pixel area in the template $T_m$. Alternatively, there may be a correspondence between a weight of the pixel area w in the picture block m corresponding to the template $T_m$ in the N templates and the ratio of the average or the weighted average of the pixel values of the determined pixel area in the template $T_m$ to the pixel value of the pixel area w or the absolute difference between the average or the weighted average of the pixel values of the determined pixel area in the template $T_m$ and the pixel value of the pixel area w.

Optionally, in some possible implementation manners of the present application, the determined pixel area in the foregoing template $T_m$ may be, for example, an upper left pixel, an upper left pixel area, a lower left pixel, a lower left pixel area, an upper right pixel, an upper right pixel area, a lower right pixel, a lower right pixel area, a center pixel area, a center pixel, or another pixel area in the template $T_m$.

The upper left pixel area in the template $T_m$ is the upper left pixel in the template $T_m$ or a pixel block that is in the template $T_m$ and that includes the upper left pixel in the template $T_m$; the lower left pixel area in the template $T_m$ is the lower left pixel in the template $T_m$ or a pixel block that is in the template $T_m$ and that includes the lower left pixel in the template $T_m$; the upper right pixel area in the template $T_m$ is the upper right pixel in the template $T_m$ or a pixel block that is in the template $T_m$ and that includes the upper right pixel in the template $T_m$; the center pixel area in the template $T_m$ is the center pixel in the template $T_m$ or a pixel block that is in the template $T_m$ and that includes the center pixel in the template $T_m$.

The distance between the pixel area w and the determined pixel area in the template $T_m$ may be, for example, a distance between a pixel in the pixel area w and a pixel in the determined pixel area in the template $T_m$, where the two pixels are closest to each other, or the distance between the pixel area w and the determined pixel area in the template $T_m$ may be a distance between any pixel in the pixel area w and any pixel in the determined pixel area in the template $T_m$, or the distance between the pixel area w and the determined pixel area in the template $T_m$ may be a distance between a determined pixel in the pixel area w (where the determined pixel in the pixel area w may be an upper left pixel, a lower left pixel, an upper right pixel, a lower right pixel, or a center pixel in the pixel area w) and a determined pixel in the determined pixel area in the template $T_m$ (where the determined pixel in the template $T_m$ is, for example, the upper left pixel, the lower left pixel, the upper right pixel, the lower right pixel, or the center pixel in the template $T_m$). Certainly, the distance between the pixel area w and the determined pixel area in the template $T_m$ may be calculated in another manner.

Optionally, in some possible implementation manners of the present application, that the N templates whose degrees of matching with the current template meet the preset condition includes: determining N templates with a highest degree of matching with the current template; or determining M templates with a highest degree of matching with the current template, and determining, from the M templates, N templates that meet the preset condition, where N is less than M.

For example, that the processor 602 is configured to determine N templates from the M templates, where distortion between pixel values of the N templates and a pixel value of the current template is less than or equal to a threshold. For example, the threshold is equal to average distortion between the pixel value of the current template and pixel values of the M templates, or the threshold is equal to an adjustment value of average distortion between the pixel value of the current template and pixel values of the M templates. Certainly, the threshold may be another preset value. It can be understood that a screening threshold is introduced to help obtain, by means of screening, a template that is with a relatively low matching degree and that is not involved in an operation, so that prediction accuracy is improved, and operation complexity is reduced.

There may be diverse manners of determining, by the processor 602, the weight of the pixel area in the picture block corresponding to each template in the N templates.

For example, that the processor 602 is configured to determine the weight of the pixel area in the picture block corresponding to each template in the N templates may include: determine a weight of each template in the N templates according to a degree of matching between each template in the N templates and the current template; and determine, based on the weight of each template in the N templates and a parameter about a similarity between each template in the N templates and the pixel area in the corresponding picture block, the weight of the pixel area in the picture block corresponding to each template in the N templates.

Optionally, in some possible implementation manners of the present application, the parameter about the similarity between each template in the N templates and the pixel area in the corresponding picture block may include: a distance between a determined pixel area in each template in the N templates and the pixel area in the corresponding picture block; and/or a ratio of an average or a weighted average of pixel values of a determined pixel area in each template in the N templates to the pixel value of the pixel area in the corresponding picture block or an absolute difference between an average or a weighted average of pixel values of a determined pixel area in each template in the N templates and the pixel value of the pixel area in the corresponding picture block.

Optionally, in some possible implementation manners of the present application, the processor 602 may be configured to determine the weight of each template in the N templates based on the following formulas and according to the degree of matching between each template in the N templates and the current template:

$$w_m = a^{-(E_{(T_x, T_m)}/S) \times \sigma},$$

where $E_{(T_x, T_m)}$ represents distortion between the current template $T_x$ and a template $T_m$ in the N templates, S represents a quantity of pixel areas in the current template $T_m$, σ represents a template scaling factor, a and σ are real numbers greater than 0, $w_m$ represents a weight of the template $T_m$, and the template $T_m$ is any template in the N templates. When a value of a is, for example, an integer such as 2, 3, or 4, operation complexity is simplified.

Optionally, in some possible implementation manners of the present application, the processor 602 may be configured to determine, based on the following formula and based on the weight of each template in the N templates and the parameter about the similarity between each template in the N templates and the pixel area in the corresponding picture block, the weight of the pixel area in the picture block corresponding to each template in the N templates:

$$w_m(i,j) = w_m^{-1/\partial(R(i,j))},$$

where $w_m(i,j)$ represents a weight of a pixel area whose coordinates are (i,j) and that is in a picture block m corresponding to the template $T_m$ in the N templates, R(i,j) represents a parameter about a similarity between the pixel area whose coordinates are (i,j) and that is in the picture block m and the template $T_m$, and $\partial(R(i,j))$ represents a pixel area scaling factor corresponding to R(i,j).

Optionally, in some possible implementation manners of the present application, there is a linear relationship or a non-linear relationship between $\partial(R(i,j))$ and R(i,j).

For example, the linear relationship between $\partial(R(i,j))$ and R(i,j) is:

$$\partial(R(i,j)) = \beta * R(i,j),$$

where β is a scaling coefficient, and β is a real number greater than 0.

For example, the non-linear relationship between $\partial(R(i,j))$ and R(i,j) is: a value of $\partial(R(i,j))$ is determined based on a distance interval within which R(i,j) falls, and different distance intervals correspond to pixel area scaling factors with different values.

For example, the non-linear relationship between $\partial(R(i,j))$ and R(i,j) may be:

$$\partial(d(i,j)) = \begin{cases} a1, & d(i,j) \le b1 \\ a2, & b1 < d(i,j) \le b2 \\ a3, & d(i,j) > b2 \end{cases},$$

where a1 is less than a2, a2 is less than a3, and b1 is less than b2; and a1, a2, a3, b1, and b2 are real numbers greater than 0.

For example, a1=0.3, a2=0.5, and a3=1. For example, b1=4, and b2=8.

For another example, the non-linear relationship between $\partial(R(i,j))$ and $R(i,j)$ may be:

$$\partial(d(i,j)) = \begin{cases} a4, & d(i,j) \le b3 \\ a5, & b3 < d(i,j) \le b4 \\ a6, & b4 < d(i,j) \le b5 \\ a7, & d(i,j) > b5 \end{cases},$$

where a4 is less than a5, a5 is less than a6, a6 is less than a7, b3 is less than b4, and b4 is less than b5; and a4, a5, a6, a7, b3, b4, and b5 are real numbers greater than 0.

For example, a4=0.3, a5=0.5, a6=0.8, and a7=1. For example, b3=4, b4=5, and b5=6.

For another example, the non-linear relationship between $\partial(R(i,j))$ and $R(i,j)$ may be:

$$\partial(d(i,j)) = \begin{cases} a8, & d(i,j) \le b6 \\ a9, & d(i,j) > b6 \end{cases},$$

where a8 is less than a9, and a8, a9, and b6 are real numbers greater than 0.

For example, a8=0.5, and a9=1. For example, b6=5.

The foregoing examples show that the non-linear relationship between $\partial(R(i,j))$ and $R(i,j)$ may be a piecewise function relationship. A piecewise quantity of a piecewise function may not be limited to 2, 3, or 4 shown in the foregoing examples, and certainly, may be larger.

Optionally, in some possible implementation manners of the present application, $R(i,j)$ may be, for example, equal to $d(i,j)$ or $e(i,j)$ $d(i,j)$ represents a distance between the pixel area whose coordinates are (i,j) and that is in the picture block m and a determined pixel area in the template $T_m$, and $e(i,j)$ represents a ratio of a pixel value of the pixel area whose coordinates are (i,j) and that is in the picture block m to an average pixel value or a weighted average pixel value of the template $T_m$, or an absolute difference between a pixel value of the pixel area whose coordinates are (i,j) and that is in the picture block m and an average pixel value or a weighted average pixel value of the template $T_m$.

For example, $d(i,j)$ may represent a distance between the pixel area whose coordinates are (i,j) and that is in the picture block m and an upper left pixel in the template $T_m$, or $d(i,j)$ may represent a distance between the pixel area whose coordinates are (i,j) and that is in the picture block m and a pixel y in the template $T_m$; and the distance between the pixel area whose coordinates are (i,j) and that is in the picture block m and the pixel y in the template $T_m$ is less than or equal to a distance between the pixel area whose coordinates are (i,j) and that is in the picture block m and any pixel in the template $T_m$ except the pixel y.

Optionally, in some possible implementation manners of the present application, the processor 602 is configured to calculate the predicted pixel value of the pixel area in the current picture block by using the following formula and based on the weight and the pixel value of the pixel area in the picture block corresponding to each template in the N templates:

$$pre(i,j) = \frac{\sum_{m=1}^{N}(w_m(i,j)p_m(i,j))}{\sum_{m=1}^{N}w_m(i,j)},$$

where $w(i,j)$ represents the weight of the pixel area whose coordinates are (i,j) and that is in the picture block m corresponding to the template $T_m$ in the N templates, $p_m(i,j)$ represents the pixel value of the pixel area whose coordinates are (i,j) and that is in the picture block m, and $pre(i,j)$ represents a predicted pixel value of a pixel area whose coordinates are (i,j) and that is in the current picture block.

It can be understood that functions of function modules of the picture prediction apparatus 600 in this embodiment may be specifically implemented according to the methods in the foregoing method embodiments. For a specific implementation process, refer to related descriptions in the foregoing method embodiments. Details are not described herein again. The picture prediction apparatus 600 may be any apparatus that needs to output or play a video, for example, a device such as a laptop computer, a tablet computer, a personal computer, or a mobile phone.

It can be learned that, after determining N templates whose degrees of matching with a current template meet a preset condition, the picture prediction apparatus 600 in this embodiment determines a weight of a pixel area in a picture block corresponding to each template in the N templates, and calculates a predicted pixel value of a pixel area in the current picture block based on the weight and a pixel value of the pixel area in the picture block corresponding to each template in the N templates. The pixel area includes at least one pixel. Weights of at least two pixel areas in a picture block corresponding to at least one template in the determined N templates are different, that is, weights of at least two pixel areas in a picture block corresponding to a same template are different. Therefore, a conventional-art solution in which weights of all pixel areas in picture blocks corresponding to all templates are the same (where the weights are all equal to 1) is abandoned. Because there is a specific difference between weights of pixel areas, this is more likely to conform to an actual correlation difference. In this way, a pixel value of a pixel area in a current picture block is accurately predicted, and video coding and decoding efficiency are improved.

Figure 7:
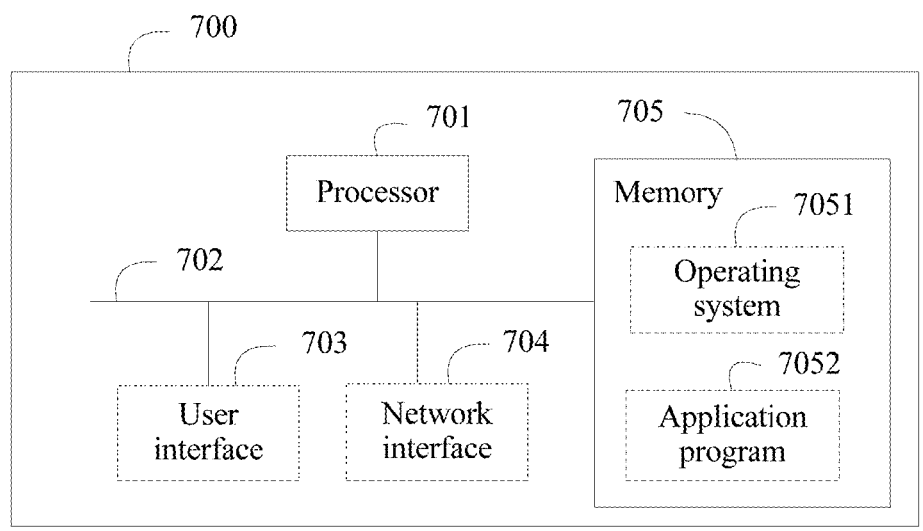
FIG. 7 is a schematic diagram of another picture prediction apparatus according to an embodiment of the present application.

Referring to FIG. 7, FIG. 7 is a structural block diagram of a picture prediction apparatus 700 according to another embodiment of the present application. The picture prediction apparatus 700 may include at least one processor 701, at least one memory 705, and at least one communications bus 702. The communications bus 702 is configured to implement a connection and communication between these components. Optionally, the picture prediction apparatus 700 may include at least one network interface 704 and/or at least one user interface 703, and the user interface 703 may include a display (for example, a touchscreen, an LCD, a holographic imaging device, a CRT, a projector), a click device (for example, a mouse, a trackball, a touchpad, a touchscreen), a camera, and/or a pickup apparatus.

The memory 705 may include a read-only memory and a random access memory, and provide an instruction and data for the processor 701. A part of the memory 705 may further include a non-volatile random access memory.

In some implementation manners, the memory 705 stores the following elements: an executable module or a data structure, or a subset of an executable module and a data structure, or an extended set of an executable module and a data structure:

an operating system 7051, including various system programs, and configured to: implement various basic services and process hardware-based tasks; and an application program module 7052, including various application programs, and configured to implement various application services.

In this embodiment of the present application, by invoking a program or an instruction stored in the memory 705, the processor 701 is configured to: determine N templates whose degrees of matching with a current template meet a preset condition, where the current template is a template corresponding to a current picture block, N is a positive integer, and the N templates are obtained by searching reference pictures of the current picture block; determine a weight of a pixel area in a picture block corresponding to each template in the N templates, where weights of at least two pixel areas in a picture block corresponding to at least one template in the N templates are different; and calculate a predicted pixel value of a pixel area in the current picture block based on the weight and a pixel value of the pixel area in the picture block corresponding to each template in the N templates, where the pixel area includes at least one pixel.

For example, N may be equal to 1, 2, 3, 4, 5, 7, 9, 12, or another value.

The pixel area mentioned in each embodiment of the present application includes at least one pixel. That is, the pixel area may be a pixel or a pixel block, and if the pixel area is a pixel block, the pixel area may have, for example, a 2×2, 1×2, 1×3, 4×2, 4×3, or 4×4 size, or another size.

The templates in the N templates correspond to different picture blocks, and therefore, the N templates correspond to N picture blocks.

For example, the weight of the pixel area in the picture block corresponding to each template in the N templates may be related to a parameter about a similarity between each template in the N templates and the pixel area in the corresponding picture block. A parameter about a similarity between two objects may be used to represent the similarity between the two objects. For example, a parameter about a similarity between a template $T_m$ in the N templates and a pixel area w in a picture block m may be used to represent the similarity between the template $T_m$ and the pixel area w in the picture block m. The picture block m is a picture block corresponding to the template $T_m$. The template $T_m$ may be any template in the N templates. The pixel area w is any pixel area in the picture block m.

In a specific example, the parameter about the similarity between the template $T_m$ and the pixel area w in the picture block m may be, for example, a distance between the pixel area w and a determined pixel area in the template $T_m$, or may be a ratio of an average or a weighted average of pixel values of a determined pixel area in the template $T_m$ to a pixel value of the pixel area w or an absolute difference between an average or a weighted average of pixel values of a determined pixel area in the template $T_m$ and a pixel value of the pixel area w. That is, there may be a correspondence between a weight of the pixel area w in the picture block m corresponding to the template $T_m$ and the distance between the pixel area w and the determined pixel area in the template $T_m$. Alternatively, there may be a correspondence between a weight of the pixel area w in the picture block m corresponding to the template $T_m$ in the N templates and the ratio of the average or the weighted average of the pixel values of the determined pixel area in the template $T_m$ to the pixel value of the pixel area w or the absolute difference between the average or the weighted average of the pixel values of the determined pixel area in the template $T_m$ and the pixel value of the pixel area w.

Optionally, in some possible implementation manners of the present application, the determined pixel area in the foregoing template $T_m$ may be, for example, an upper left pixel, an upper left pixel area, a lower left pixel, a lower left pixel area, an upper right pixel, an upper right pixel area, a lower right pixel, a lower right pixel area, a center pixel area, a center pixel, or another pixel area in the template $T_m$.

The upper left pixel area in the template $T_m$ is the upper left pixel in the template $T_m$ or a pixel block that is in the template $T_m$ and that includes the upper left pixel in the template $T_m$; the lower left pixel area in the template $T_m$ is the lower left pixel in the template $T_m$ or a pixel block that is in the template $T_m$ and that includes the lower left pixel in the template $T_m$; the upper right pixel area in the template $T_m$ is the upper right pixel in the template $T_m$ or a pixel block that is in the template $T_m$ and that includes the upper right pixel in the template $T_m$; the center pixel area in the template $T_m$ is the center pixel in the template $T_m$ or a pixel block that is in the template $T_m$ and that includes the center pixel in the template $T_m$.

The distance between the pixel area w and the determined pixel area in the template $T_m$ may be, for example, a distance between a pixel in the pixel area w and a pixel in the determined pixel area in the template $T_m$, where the two pixels are closest to each other, or the distance between the pixel area w and the determined pixel area in the template $T_m$ may be a distance between any pixel in the pixel area w and any pixel in the determined pixel area in the template $T_m$, or the distance between the pixel area w and the determined pixel area in the template $T_m$ may be a distance between a determined pixel in the pixel area w (where the determined pixel in the pixel area w may be an upper left pixel, a lower left pixel, an upper right pixel, a lower right pixel, or a center pixel in the pixel area w) and a determined pixel in the determined pixel area in the template $T_m$ (where the determined pixel in the template $T_m$ is, for example, the upper left pixel, the lower left pixel, the upper right pixel, the lower right pixel, or the center pixel in the template $T_m$). Certainly, the distance between the pixel area w and the determined pixel area in the template $T_m$ may be calculated in another manner.

Optionally, in some possible implementation manners of the present application, that the N templates whose degrees of matching with the current template meet the preset condition includes: determining N templates with a highest degree of matching with the current template; or determining M templates with a highest degree of matching with the current template, and determining, from the M templates, N templates that meet the preset condition, where N is less than M.

For example, that the processor 701 determines, from the M templates, the N templates that meet the preset condition includes: determining N templates from the M templates, where distortion between pixel values of the N templates and a pixel value of the current template is less than or equal to a threshold. For example, the threshold is equal to average distortion between the pixel value of the current template and pixel values of the M templates, or the threshold is equal to an adjustment value of average distortion between the pixel value of the current template and pixel values of the M templates. Certainly, the threshold may be another preset value. It can be understood that a screening threshold is introduced to help obtain, by means of screening, a template that is with a relatively low matching degree and that is not involved in an operation, so that prediction accuracy is improved, and operation complexity is reduced.

There may be diverse manners of determining, by the processor 701, the weight of the pixel area in the picture block corresponding to each template in the N templates.

For example, that the processor 701 determines the weight of the pixel area in the picture block corresponding to each template in the N templates may include: determining a weight of each template in the N templates according to a degree of matching between each template in the N templates and the current template; and determining, based on the weight of each template in the N templates and a parameter about a similarity between each template in the N templates and the pixel area in the corresponding picture block, the weight of the pixel area in the picture block corresponding to each template in the N templates.

Optionally, in some possible implementation manners of the present application, the parameter about the similarity between each template in the N templates and the pixel area in the corresponding picture block may include: a distance between a determined pixel area in each template in the N templates and the pixel area in the corresponding picture block; and/or a ratio of an average or a weighted average of pixel values of a determined pixel area in each template in the N templates to the pixel value of the pixel area in the corresponding picture block or an absolute difference between an average or a weighted average of pixel values of a determined pixel area in each template in the N templates and the pixel value of the pixel area in the corresponding picture block.

Optionally, in some possible implementation manners of the present application, the processor 701 may determine the weight of each template in the N templates based on the following formula and according to the degree of matching between each template in the N templates and the current template:

$$w_m = a^{-(E_{(T_x,T_m)}/S)\times\sigma},$$

where $E_{(T_x,T_m)}$ represents distortion between the current template $T_x$ and a template $T_m$ in the N templates, S represents a quantity of pixel areas in the current template $T_m$, $\sigma$ represents a template scaling factor, a and $\sigma$ are real numbers greater than 0, $w_m$ represents a weight of the template $T_m$, and the template $T_m$ is any template in the N templates. When a value of a is, for example, an integer such as 2, 3, or 4, operation complexity is simplified.

Optionally, in some possible implementation manners of the present application, the processor 701 may determine, based on the following formula and based on the weight of each template in the N templates and the parameter about the similarity between each template in the N templates and the pixel area in the corresponding picture block, the weight of the pixel area in the picture block corresponding to each template in the N templates:

$$W_m(i,j) = W_m^{-1/\partial(R(i,j))},$$

where $W_m(i,j)$ represents a weight of a pixel area whose coordinates are (i,j) and that is in a picture block m corresponding to the template $T_m$ in the N templates, R(i,j) represents a parameter about a similarity between the pixel area whose coordinates are (i,j) and that is in the picture block m and the template $T_m$, and $\partial(R(i,j))$ represents a pixel area scaling factor corresponding to R(i,j).

Optionally, in some possible implementation manners of the present application, there is a linear relationship or a non-linear relationship between $\partial(R(i,j))$ and R(i,j).

For example, the linear relationship between $\partial(R(i,j))$ and R(i,j) is:

$$\partial(R(i,j)) = \beta * R(i,j),$$

where $\beta$ is a scaling coefficient, and $\beta$ is a real number greater than 0.

For example, the non-linear relationship between $\partial(R(i,j))$ and R(i,j) is: a value of $\partial(R(i,j))$ is determined based on a distance interval within which R(i,j) falls, and different distance intervals correspond to pixel area scaling factors with different values.

For example, the non-linear relationship between $\partial(R(i,j))$ and R(i,j) may be:

$$\partial(d(i,j)) = \begin{cases} a1, & d(i,j) \leq b1 \\ a2, & b1 < d(i,j) \leq b2 \\ a3, & d(i,j) > b2 \end{cases},$$

where, a1 is less than a2, a2 is less than a3, and b1 is less than b2; and a1, a2, a3, b1, and b2 are real numbers greater than 0.

For example, a1=0.3, a2=0.5, and a3=1. For example, b1=4, and b2=8.

For another example, the non-linear relationship between $\partial(R(i,j))$ and R(i,j) may be:

$$\partial(d(i,j)) = \begin{cases} a4, & d(i,j) \leq b3 \\ a5, & b3 < d(i,j) \leq b4 \\ a6, & b4 < d(i,j) \leq b5 \\ a7, & d(i,j) > b5 \end{cases},$$

where a4 is less than a5, a5 is less than a6, a6 is less than a7, b3 is less than b4, and b4 is less than b5; and a4, a5, a6, a7, b3, b4, and b5 are real numbers greater than 0.

For example, a4=0.3, a5=0.5, a6=0.8, and a7=1. For example, b3=4, b4=5, and b5=6.

For another example, the non-linear relationship between $\partial(R(i,j))$ and R(i,j) may be:

$$\partial(d(i,j)) = \begin{cases} a8, & d(i,j) \leq b6 \\ a9, & d(i,j) > b6 \end{cases},$$

where a8 is less than a9, and a8, a9, and b6 are real numbers greater than 0.

For example, a8=0.5, and a9=1. For example, b6=5.

The foregoing examples show that the non-linear relationship between $\partial(R(i,j))$ and $R(i,j)$ may be a piecewise function relationship. A piecewise quantity of a piecewise function may not be limited to 2, 3, or 4 shown in the foregoing examples, and certainly, may be larger.

Optionally, in some possible implementation manners of the present application, $R(i,j)$ may be, for example, equal to $d(i,j)$ or $e(i,j)$, $d(i,j)$ represents a distance between the pixel area whose coordinates are $(i,j)$ and that is in the picture block m and a determined pixel area in the template $T_m$, and $e(i,j)$ represents a ratio of a pixel value of the pixel area whose coordinates are $(i,j)$ and that is in the picture block m to an average pixel value or a weighted average pixel value of the template $T_m$, or an absolute difference between a pixel value of the pixel area whose coordinates are $(i,j)$ and that is in the picture block m and an average pixel value or a weighted average pixel value of the template $T_m$.

For example, $d(i,j)$ may represent a distance between the pixel area whose coordinates are $(i,j)$ and that is in the picture block m and an upper left pixel in the template $T_m$, or $d(i,j)$ may represent a distance between the pixel area whose coordinates are $(i,j)$ and that is in the picture block m and a pixel y in the template $T_m$; and the distance between the pixel area whose coordinates are $(i,j)$ and that is in the picture block m and the pixel y in the template $T_m$ is less than or equal to a distance between the pixel area whose coordinates are $(i,j)$ and that is in the picture block m and any pixel in the template $T_m$ except the pixel y.

Optionally, in some possible implementation manners of the present application, the processor 701 calculates the predicted pixel value of the pixel area in the current picture block by using the following formula and based on the weight and the pixel value of the pixel area in the picture block corresponding to each template in the N templates:

$$pre(i,j) = \frac{\sum_{m=1}^{N}(w_m(i,j)p_m(i,j))}{\sum_{m=1}^{N}w_m(i,j)},$$

where $w_m(i,j)$ represents the weight of the pixel area whose coordinates are $(i,j)$ and that is in the picture block m corresponding to the template $T_m$ in the N templates, $p_m(i,j)$ represents the pixel value of the pixel area whose coordinates are $(i,j)$ and that is in the picture block m, and $pre(i,j)$ represents a predicted pixel value of a pixel area whose coordinates are $(i,j)$ and that is in the current picture block.

It can be understood that functions of function modules of the picture prediction apparatus 700 in this embodiment may be specifically implemented according to the methods in the foregoing method embodiments. For a specific implementation process, refer to related descriptions in the foregoing method embodiments. Details are not described herein again. The picture prediction apparatus 700 may be any apparatus that needs to output or play a video, for example, a device such as a laptop computer, a tablet computer, a personal computer, or a mobile phone.

It can be learned that, after determining N templates whose degrees of matching with a current template meet a preset condition, the picture prediction apparatus 700 in this embodiment determines a weight of a pixel area in a picture block corresponding to each template in the N templates, and calculates a predicted pixel value of a pixel area in the current picture block based on the weight and a pixel value of the pixel area in the picture block corresponding to each template in the N templates. The pixel area includes at least one pixel. Weights of at least two pixel areas in a picture block corresponding to at least one template in the determined N templates are different, that is, weights of at least two pixel areas in a picture block corresponding to a same template are different. Therefore, a conventional-art solution in which weights of all pixel areas in picture blocks corresponding to all templates are the same (where the weights are all equal to 1) is abandoned. Because there is a specific difference between weights of pixel areas, this is more likely to conform to an actual correlation difference. In this way, a pixel value of a pixel area in a current picture block is accurately predicted, and video coding and decoding efficiency are improved.

It should be noted that, to make the descriptions brief, the foregoing method embodiments are expressed as a series of actions. However, persons skilled in the art should appreciate that the present application is not limited to the described action sequence, because according to the present application, some steps may be performed in other sequences or performed simultaneously. In addition, persons skilled in the art should also appreciate that all the embodiments described in the specification are implementable embodiments, and the related actions and modules are not necessarily mandatory to the present application.

In the foregoing embodiments, all the embodiments have respective focuses of description. For a part that is not described in detail in an embodiment, refer to related descriptions in other embodiments.

In the embodiments provided in this application, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions in the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions in the present application essentially, or the part contributing to the prior art, or all or some of the technical solutions may be implemented in the form of a software product. The software product is stored in a storage medium and includes instructions for instructing a computer device (which may be a personal computer, a server, or a network device) to perform all or some of the steps of the methods described in the embodiments of the present application. The foregoing storage medium includes any medium that can store program code, such as a USB flash drive, a read-only memory (ROM), a random access memory (RAM), a removable hard disk, a magnetic disk, or an optical disc.

The foregoing embodiments are merely intended for describing the technical solutions in the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions in the embodiments of the present application.

What is claimed is:

1. A picture prediction method implemented by a processor, comprising:

determining M templates with a highest degree of matching with a current template;

determining, from the M templates, N templates whose degrees of matching with the current template meet a preset condition, wherein the current template is a template that corresponds to a current picture block, wherein N is a positive integer, wherein the N templates are obtained from reference pictures of the current picture block, and wherein N is less than M;

determining a weight of a pixel area in a picture block that spatially corresponds to a highest matching candidate from within the N templates, wherein determining the weight of the pixel area in the picture block further comprises:

determining a weight of each of the N templates based on the formula $$w_m = a^{-(E(T_x, T_m)/S) \times \sigma}$$

and according to a degree of matching between each of the N templates and the current template $T_x$ wherein $E_{(T_x, T_m)}$ represents distortion between the current template $T_x$ and a template $T_m$ in the N templates, wherein S represents a quantity of pixel areas in the current template $T_x$, wherein $\sigma$ represents a template scaling factor, wherein $\alpha$ and $\sigma$ are real numbers greater than 0, wherein $w_m$ represents a weight of the template $T_m$, and wherein the template $T_m$ is any template in the N templates; and determining, based on the weight of each of the N templates and a parameter about a similarity between each of the N templates and the pixel area in a corresponding picture block, the weight of the pixel area in a picture that corresponds to each of the N templates according to the formula $w_m(i,j) = w_m^{-\partial(R(i,j))}$, wherein $w_m(i,j)$ represents a weight of a pixel area whose coordinates are (i, j) that is in a picture block m that corresponds to the template $T_m$, wherein R(i, j) represents a parameter about a similarity between the pixel area whose coordinates are (i, j) that is in the picture block m and the template $T_m$, wherein $\partial(R(i, j))$ represents a pixel area scaling factor that corresponds to the R(i, j), wherein a value of $\partial(R(i, j))$ is based on a distance interval within which the R(i, j) falls, wherein the $\partial(R(i, j))$ comprises either a linear relationship to the R(i, j) or a non-linear relationship to the R(i, j), wherein the linear relationship is $\beta*R(i,j)$, wherein the non-linear relationship comprises the value of $\partial(R(i, j))$, and wherein $\beta$ is a scaling coefficient and a real number greater than 0; and calculating a predicted pixel value of a pixel area in the current picture block based on a weighted pixel value of the pixel area in the picture block that corresponds to the template comprising a highest degree of matching from within the N templates, wherein the pixel area comprises at least one pixel.

2. The method of claim 1, wherein the parameter about the similarity between each of the N templates and the pixel area in the corresponding picture block comprises either:

a distance between a determined pixel area in each of the N templates and the pixel area in the corresponding picture block;

a ratio of an average of pixel values of a determined pixel area in each of the N templates to a pixel value of the pixel area in the corresponding picture block;

a weighted average of the pixel values of the determined pixel area in each of the N templates to the pixel value of the pixel area in the corresponding picture block;

an absolute difference between an average of the pixel values of the determined pixel area in each of the N templates and the pixel value of the pixel area in the corresponding picture block; or a weighted average of the pixel values of the determined pixel area in each of the N templates and the pixel value of the pixel area in the corresponding picture block.

3. The method of claim 1, wherein the different distance intervals correspond to pixel area scaling factors with different values.

4. The method of claim 3, wherein (a) the non-linear relationship between $\partial(R(i, j))$ and R(i, j) is:

$$\partial(d(i, j)) = \begin{cases} a1, & d(i, j) \leq b1 \\ a2, & b1 < d(i, j) \leq b2 \\ a3, & d(i, j) > b2 \end{cases},$$

wherein a1 is less than a2, wherein the a2 is less than a3, wherein b1 is less than b2; and wherein the a1, the a2, the a3, the b1, and the b2 are real numbers greater than 0, (b) the non-linear relationship between the $\partial(R(i, j))$ and the R(i, j) is:

$$\partial(d(i, j)) = \begin{cases} a4, & d(i, j) \leq b3 \\ a5, & b3 < d(i, j) \leq b4 \\ a6, & b4 < d(i, j) \leq b5 \\ a7, & d(i, j) > b5 \end{cases},$$

wherein a4 is less than a5, wherein the a5 is less than a6, wherein the a6 is less than a7, wherein the b3 is less than b4, wherein the b4 is less than b5; and wherein the a4, the a5, the a6, the a7, the b3, the b4, and the b5 are real numbers greater than 0 or (c) the non-linear relationship between $\partial(R(i, j))$ and R(i, j) is:

$$\partial(d(i, j)) = \begin{cases} a8, d(i, j) \le b6 \\ a9, d(i, j) > b6 \end{cases},$$

wherein a8 is less than a9, and wherein a8, a9, and b6 are real numbers greater than 0.

5. The method of claim 1, wherein R(i,j) is equal to either d(i, j) or e(i, j), wherein the d(i, j) represents a distance between the pixel area whose coordinates are (i, j) and that is in the picture block m and a determined pixel area in the template $T_m$, and wherein the e(i, j) represents either:
a ratio of a pixel value of the pixel area whose coordinates are (i, j) and that is in the picture block m to an average pixel value or a weighted average pixel value of the template $T_m$; or
an absolute difference between a pixel value of the pixel area whose coordinates are the (i, j) and that is in the picture block m and an average pixel value or a weighted average pixel value of the template $T_m$.

6. The method of claim 5, wherein d(i, j) represents either (a) a distance between the pixel area whose coordinates are (i, j) and that is in the picture block m and an upper left pixel in the template $T_m$, or (b) d(i, j) represents a distance between the pixel area whose coordinates are the (i, j) and that is in the picture block m and a pixel y in the template $T_m$ and wherein the distance between the pixel area whose coordinates are the (i,j) and that is in the picture block m and the pixel y in the template $T_m$ is less than or equal to a distance between the pixel area whose coordinates are the (i, j) and that is in the picture block m and any pixel in the template $T_m$ except the pixel y.

7. The method of claim 1, wherein calculating the predicted pixel value of a pixel area in the current picture block based on the weight and a pixel value of the pixel area in the picture block that corresponds to each of the N templates comprises calculating the predicted pixel value of the pixel area in the current picture block using the following formula and based on the weight and the pixel value of the pixel area in the picture block that corresponds to each of the N templates:

$$pre(i, j) = \frac{\sum_{m=1}^{N}(w_m(i, j)p_m(i, j))}{\sum_{m=1}^{N}w_m(i, j)},$$

wherein $W_m(i,j)$ represents the weight of the pixel area whose coordinates are (i,j) and that is in a picture block m that corresponds to the template $T_m$ in the N templates, wherein $p_m(i, j)$ represents the pixel value of the pixel area whose coordinates are the (i,j) and that is in the picture block m, and wherein the pre(i, j) represents a predicted pixel value of a pixel area whose coordinates are the (i, j) and that is in the current picture block.

8. The method of claim 1, wherein determining, from the M templates, the N templates that meet the preset condition comprises determining the N templates from the M templates, wherein distortion between pixel values of the N templates and a pixel value of the current template is less than or equal to a threshold.

9. The method of claim 8, wherein either (a) the threshold is equal to average distortion between a pixel value of the current template and pixel values of the M templates or (b) the threshold is equal to an adjustment value of average distortion between the pixel value of the current template and pixel values of the M templates.

10. The method of claim 1, wherein the picture prediction method is applied in a video coding process or in a video decoding process.

11. A picture prediction apparatus, comprising:
a memory comprising instructions; and
a processor coupled to the memory and configured to execute the instructions, wherein the instructions cause the processor to:
determine M templates with a highest degree of matching with a current template;
determine, from the M templates, N templates whose degrees of matching with the current template meet a preset condition, wherein the current template is a template that corresponds to a current picture block, wherein N is a positive integer, wherein the N templates are obtained from reference pictures of the current picture block, and wherein N is less than M;
determine a weight of a pixel area in a picture block that spatially corresponds to a highest matching candidate from within the N templates, wherein determining the weight of the pixel area in the picture block further comprises:
determining a weight of each of the N templates based on the formula $$w_m = a^{-(E_{(T_x, T_m)}/S) \times \sigma}$$

and according to a degree of matching between each of the N templates and the current template $T_x$, wherein $E_{(T_x, T_m)}$ represents distortion between the current template $T_x$ and a template $T_m$ in the N templates, wherein S represents a quantity of pixel areas in the current template $T_x$, wherein σ represents a template scaling factor, wherein α and σ are real numbers greater than 0, wherein $W_m$ represents a weight of the template $T_m$, and wherein the template $T_m$ is any template in the N templates; and
determining, based on the weight of each of the N templates and a parameter about a similarity between each of the N templates and the pixel area in a corresponding picture block, the weight of the pixel area in a picture that corresponds to each of the N templates according to the formula $W_m(i, j) = W_m^{-1/\partial(R(i,j))}$, wherein $W_m(i,j)$ represents a weight of a pixel area whose coordinates are (i, j) that is in a picture block m that corresponds to the template $T_m$, wherein R(i, j) represents a parameter about a similarity between the pixel area whose coordinates are (i, j) that is in the picture block m and the template $T_m$, wherein $\partial(R(i, j))$ represents a pixel area scaling factor that corresponds to the R(i,j), wherein a value of $\partial(R(i,j))$ is based on a distance interval within which the R(i, j) falls, wherein the $\partial(R(i, j))$ comprises either a linear relationship to the R(i, j) or a non-linear relationship to the R(i, j), wherein the linear relationship is β*R(i,j), wherein the non-linear relationship comprises the value of $\partial(R(i, j))$ and wherein β is a scaling coefficient and a real number greater than 0; and
calculate a predicted pixel value of a pixel area in the current picture block based on weighted pixel value of the pixel area in the picture block that corresponds to the template comprising a highest degree of matching from within the N templates, wherein the pixel area comprises at least one pixel.

12. The picture prediction apparatus of claim 11, wherein the parameter about the similarity between each of the N templates and the pixel area in the corresponding picture block comprises either:

a distance between a determined pixel area in each of the N templates and the pixel area in the corresponding picture block;

a ratio of an average of pixel values of a determined pixel area in each of the N templates to a pixel value of the pixel area in the corresponding picture block;

a weighted average of the pixel values of the determined pixel area in each of the N templates to the pixel value of the pixel area in the corresponding picture block;

an absolute difference between an average of pixel values of the determined pixel area in each of the N templates and the pixel value of the pixel area in the corresponding picture block; or a weighted average of the pixel values of the determined pixel area in each of the N templates and the pixel value of the pixel area in the corresponding picture block.

13. The picture prediction apparatus of claim 11, wherein the picture prediction apparatus is applied to a video coding apparatus or to a video decoding apparatus.

14. The picture prediction apparatus of claim 11, wherein weighted values of at least two different pixel areas in a picture block that corresponds to at least one of the N templates are different.

15. The method of claim 1, wherein weighted values of at least two different pixel areas in a picture block that corresponds to at least one of the N templates are different.

* * * * *